(12) United States Patent
Bala et al.

(10) Patent No.: US 10,536,315 B2
(45) Date of Patent: Jan. 14, 2020

(54) METHODS AND PROCEDURES TO IMPROVE PHYSICAL LAYER EFFICIENCY USING UNIQUE WORD (UW) DISCRETE FOURIER TRANSFORM SPREAD ORTHOGONAL FREQUENCY DIVISION MULTIPLEXING (DFT-S-OFDM)

(71) Applicant: IDAC HOLDINGS, INC., Wilmington, DE (US)

(72) Inventors: Erdem Bala, East Meadow, NY (US); Alphan Sahin, Westbury, NY (US); Moon-il Lee, Melville, NY (US); Afshin Haghighat, Ile-Bizard (CA); Ananth Kini, East Norriton, PA (US); Mihaela C. Beluri, Jericho, NY (US); Rui Yang, Greenlawn, NY (US); Janet A. Stern-Berkowitz, Little Neck, NY (US); Leonid L. Kazakevich, Plainview, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/089,246

(22) PCT Filed: Mar. 30, 2017

(86) PCT No.: PCT/US2017/025103
§ 371 (c)(1),
(2) Date: Sep. 27, 2018

(87) PCT Pub. No.: WO2017/173125
PCT Pub. Date: Oct. 5, 2017

(65) Prior Publication Data
US 2019/0097859 A1 Mar. 28, 2019

Related U.S. Application Data

(60) Provisional application No. 62/315,448, filed on Mar. 30, 2016, provisional application No. 62/334,855, (Continued)

(51) Int. Cl.
*H04L 27/26* (2006.01)
*H04L 25/02* (2006.01)

(52) U.S. Cl.
CPC ...... *H04L 27/2636* (2013.01); *H04L 25/0224* (2013.01); *H04L 27/2613* (2013.01)

(58) Field of Classification Search
CPC . H04L 27/2613; H04L 5/0048; H04L 5/0007; H04L 1/08; H04L 27/2636;
(Continued)

(56) References Cited

U.S. PATENT DOCUMENTS

| | | | |
|---|---|---|---|
| 9,893,853 B2 * | 2/2018 | Yi | H04L 1/08 |
| 2011/0206089 A1 * | 8/2011 | Cho | H04W 72/042 375/141 |

(Continued)

FOREIGN PATENT DOCUMENTS

| | | |
|---|---|---|
| WO | 2014/124661 | 8/2014 |
| WO | 2017/173131 | 10/2017 |
| WO | 2017/189316 | 11/2017 |

OTHER PUBLICATIONS

Berardinelli et al., "On the Potential of Zero-Tail DFT-Spread-OFDM in 5G Networks," Proceedings of the IEEE Vehicular Technology Conference (VTC) (Sep. 2014).
(Continued)

*Primary Examiner* — Khanh C Tran
(74) *Attorney, Agent, or Firm* — Volpe and Koenig, P.C.

(57) ABSTRACT

Methods, devices, and systems for transmitting information using a unique word (UW) with discrete Fourier transform
(Continued)

spread orthogonal frequency division multiplexing (DFT-s-OFDM) are described herein. In an example, a wireless transmit/receive unit (WTRU) may generate a reference sequence. Further, the WTRU may generate a DMRS sequence based on upsampling of the reference sequence. In an example, the DMRS sequence may include a plurality of repeating sequences. Further, in an example, each repeating sequence may include a head sequence, a reference sequences and a tail sequence. Also, a UW sequence within the DMRS may include one of the repeated head sequences and one of the repeated tail sequences. In addition, the WTRU may generate a DMRS signal based on a waveform operation on the DMRS sequence. The WTRU may then transmit the DMRS signal as a reference signal.

16 Claims, 32 Drawing Sheets

Related U.S. Application Data filed on May 11, 2016, provisional application No. 62/373,087, filed on Aug. 10, 2016.

(58) Field of Classification Search
CPC ............. H04L 27/2649; H04L 27/2675; H04L 5/0051; H04L 25/0224; H04W 56/00; H04B 17/318; H04B 7/0413
See application file for complete search history.

(56) References Cited

U.S. PATENT DOCUMENTS

| | | | | |
|---|---|---|---|---|
| 2017/0012753 | A1* | 1/2017 | Kim | H04W 76/14 |
| 2018/0375710 | A1* | 12/2018 | Chae | H04W 4/70 |
| 2019/0028252 | A1* | 1/2019 | Akkarakaran | H04L 5/0048 |
| 2019/0089504 | A1* | 3/2019 | Hwang | H04L 5/001 |
| 2019/0124675 | A1* | 4/2019 | Gao | H04W 72/04 |

OTHER PUBLICATIONS

Berardinelli et al., "Zero-tail DFT-spread-OFDM signals," Globecom 2013 Workshop, pp. 229-234 (Dec. 9, 2013).
Huemer et al., "Design and analysis of UW-OFDM signals," AEU—International Journal of Electronics and Communications, vol. 68, Issue 10, pp. 958-968 (Oct. 2014).
Huemer et al., "Non-Systematic Complex No. RS Coded OFDM by Unique Word Prefix," IEEE Transactions on Signal Processing, vol. 60, No. 1, pp. 285-299, (Jan. 2012).
Intel Corporation, "Further discussion on GI-DFT-s-OFDM for high frequency bands above 40 GHz," 3GPP TSG RAN WG1 Meeting #86, R1-167126, Gothenburg, Sweden (Aug. 22-26, 2016).
Intel Corporation, "Single carrier based waveform for high frequency bands above 40 GHz," 3GPP TSG RAN WG1 Meeting #86, R1-167125, Gothenburg, Sweden (Aug. 22-26, 2016).
Interdigital Communications, "Channel estimation and phase tracking for Unique Word DFT-s-OFDM," 3GPP TSG-RAN WG1 Meeting #86, R1-167560, Gothenburg, Sweden (Aug. 22-26, 2016).
Interdigital Communications, "Comparison of UW DFT-s-OFDM and Windowed OFDM," 3GPP TSG-RAN WG1 Meeting #86, R1-167558, Gothenburg, Sweden (Aug. 22-26, 2016).
Interdigital Communications, "Performance Evaluation of UW DFT-S-OFDM Waveform for UL," 3GPP TSG RAN WG1 Meeting #85, R1-165057, Nanjing, China (May 23-27, 2016).
Mitsubishi Electric, "UW DFTsOFDM link level evaluation results above 30GHz," 3GPP TSG-RAN WG1 #86, R1-166227, Göteborg, Sweden (Aug. 22-26, 2016).
Mitsubishi Electric, "Views on NR waveforms," 3GPP TSG RAN WG1 Meeting#84b, R1-162537, Busan, Republic of Korea (Apr. 11-15, 2016).
National Taiwan University, "Fundamentals of CPS-OFDM Waveform for 5G New Radio," 3GPP TSG RAN WG1 Meeting #86, R1-167820, Gothenburg, Sweden (Aug. 22-26, 2016).
Nokia et al., "OFD, based Waveform for 5G new radio interface," 3GPP TSG-RAN WG1 #84bis, R1-162889, Busan, Korea (Apr. 11-15, 2016).
Nokia et al., "Waveform proposal for carrier frequencies beyond 40 GHz," 3GPP TSG-RAN WG1#86, R1-167794, Gothenburg, Sweden (Aug. 22-26, 2016).
Panasonic, "Considerations on waveform design for new radio interface," 3GPP TSG RAN WG1 Meeting #84bis, R1-162551, Busan, Korea (Apr. 11-15, 2016).
Sahin et al., "An Improved Unique Word DFT-Spread OFDM Scheme for 5G Systems," IEEE Globecom Workshops (Dec. 2015).
Sahin et al., "Flexible DFT-S-OFDM Solutions and Challenges," New Waveforms and Multiple Access Methods for 5G Networks, IEEE Communications Magazine (Nov. 2016).
Huawei et al., "Discussions on waveform for high frequencies," 3GPP TSG RAN WG1 Meeting #85, R1-164369, Nanjing, China (May 15, 2016).
Interdigital Communications et al., "Discussion on Unique Word DFT-S-OFDM Waveform for New Radio," 3GPP TSG RAN WG1 Meeting #85, R1-165065, Nanjing, China (May 14, 2016).
Interdigital Communications, Design Considerations on Waveform in UL for New Radio Systems, 3GPP TSG RAN WG1 Meeting #84bis, R1-162925, Busan, Korea (Apr. 1, 2016).
Mitsubishi Electric, "UW DFTsOFDM link level evaluation results below 6GHz," 3GPP TSG-RAN WG1 #86, R1-166226, Göteborg, Sweden (Aug. 9, 2016).

* cited by examiner

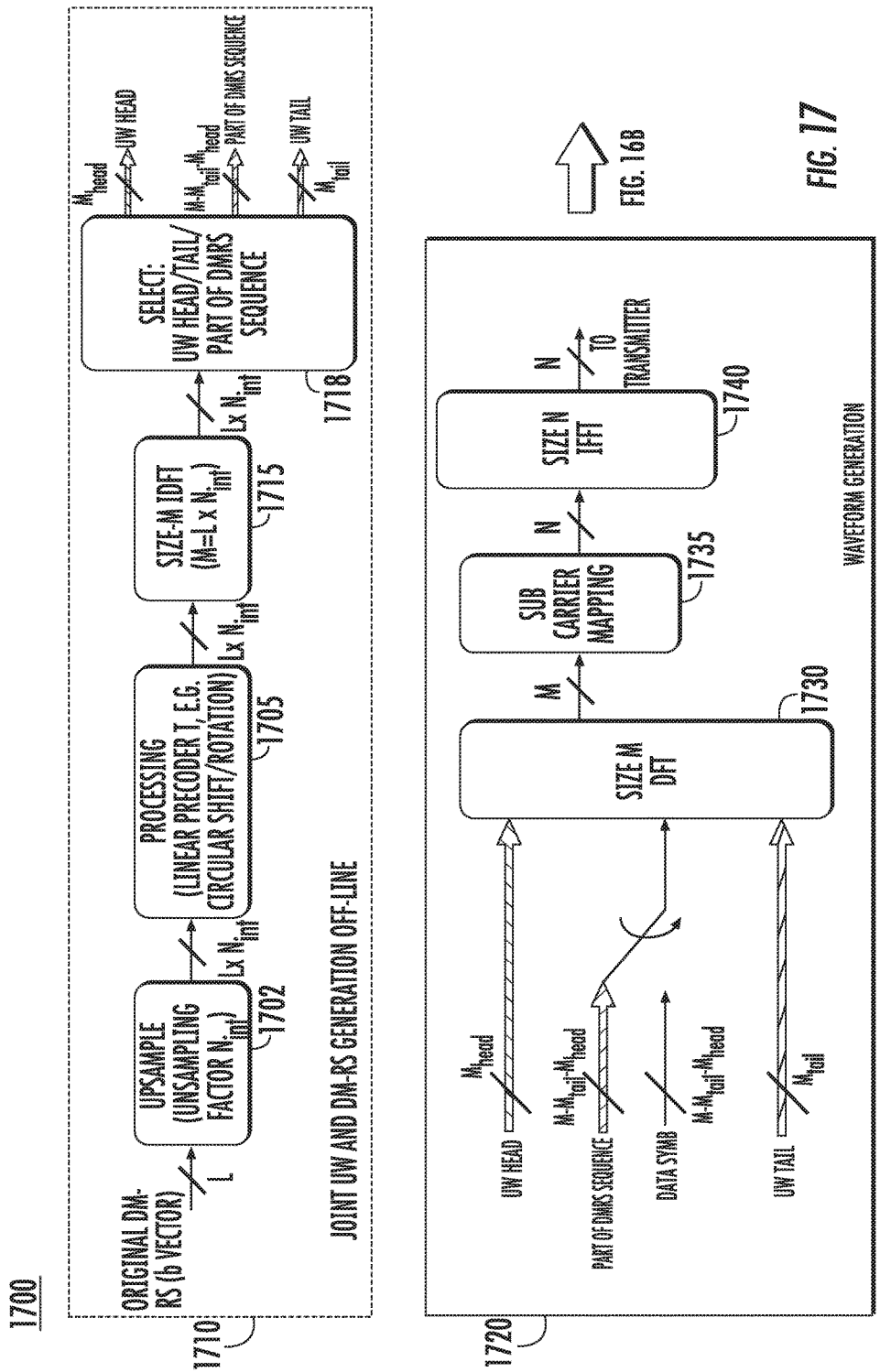

METHODS AND PROCEDURES TO IMPROVE PHYSICAL LAYER EFFICIENCY USING UNIQUE WORD (UW) DISCRETE FOURIER TRANSFORM SPREAD ORTHOGONAL FREQUENCY DIVISION MULTIPLEXING (DFT-S-OFDM)

CROSS REFERENCE TO RELATED APPLICATIONS

This application is the U.S. National Stage, under 35 U.S.C. § 371, of International Application No. PCT/US2017/025103 filed Mar. 30, 2017, which claims the benefit of U.S. Provisional Application Ser. No. 62/315,448 filed Mar. 30, 2016, U.S. Provisional Application Ser. No. 62/334,855 filed May 11, 2016 and U.S. Provisional Application Ser. No. 62/373,087 filed Aug. 10, 2016, the contents of which are hereby incorporated by reference herein.

BACKGROUND

Orthogonal frequency division multiplexing (OFDM) has been used for Long Term Evolution (LTE) and IEEE 802.11 radio technologies due to its simplicity in mitigating frequency selective channels by converting them into smaller flat fading sub-channels. Discrete Fourier transform spread OFDM (DFT-s-OFDM) may improve the peak-to-average power ratio (PAPR) of OFDM by spreading the data sequence with a DFT before mapping it to sub-carriers at the inverse fast Fourier transform (IFFT) input.

Both OFDM and DFT-s-OFDM may use a cyclic prefix (CP) to prevent the inter-symbol interference (ISI) that may occur due to the channel delay spread and timing synchronization errors. Current LTE systems may support two values of the CP: normal CP and extended CP. The number of OFDM symbols per sub-frame may be 14 for normal CP and 12 for extended CP. As the CP is configured per cell, the system may lose some spectral efficiency if configured for extended CP and not all the wireless transmit/receive units (WTRUs) in the cell may experience the same large delay spread.

SUMMARY

Methods, devices, and systems for transmitting information using a unique word (UW) with discrete Fourier transform spread orthogonal frequency division multiplexing (DFT-s-OFDM) are described herein. In an example, a wireless transmit/receive unit (WTRU) may generate a reference sequence. Further, the WTRU may generate a DMRS sequence based on upsampling of the reference sequence. In an example, the DMRS sequence may include a plurality of repeating sequences. Further, in an example, each repeating sequence may include a head sequence, a reference sequences and a tail sequence. Also, a UW sequence within the DMRS may include one of the repeated head sequences and one of the repeated tail sequences. In addition, the WTRU may generate a DMRS signal based on a waveform operation on the DMRS sequence. The WTRU may then transmit the DMRS signal as a reference signal.

In a further example, the WTRU may generate a plurality of input vectors, wherein each input vector includes a sequence of data symbols and the UW sequence. The WTRU may then generate a plurality of DFT-s-OFDM symbols, wherein each DFT-s-OFDM symbol is based on a waveform operation on each of the input vectors. Further, the WTRU may transmit the plurality of DFT-s-OFDM symbols.

BRIEF DESCRIPTION OF THE DRAWINGS

A more detailed understanding may be had from the following description, given by way of example in conjunction with the accompanying drawings wherein:

FIG. 17 is a block and signal diagram illustrating another example of joint DMRS and UW;

DETAILED DESCRIPTION

Figure 1A:
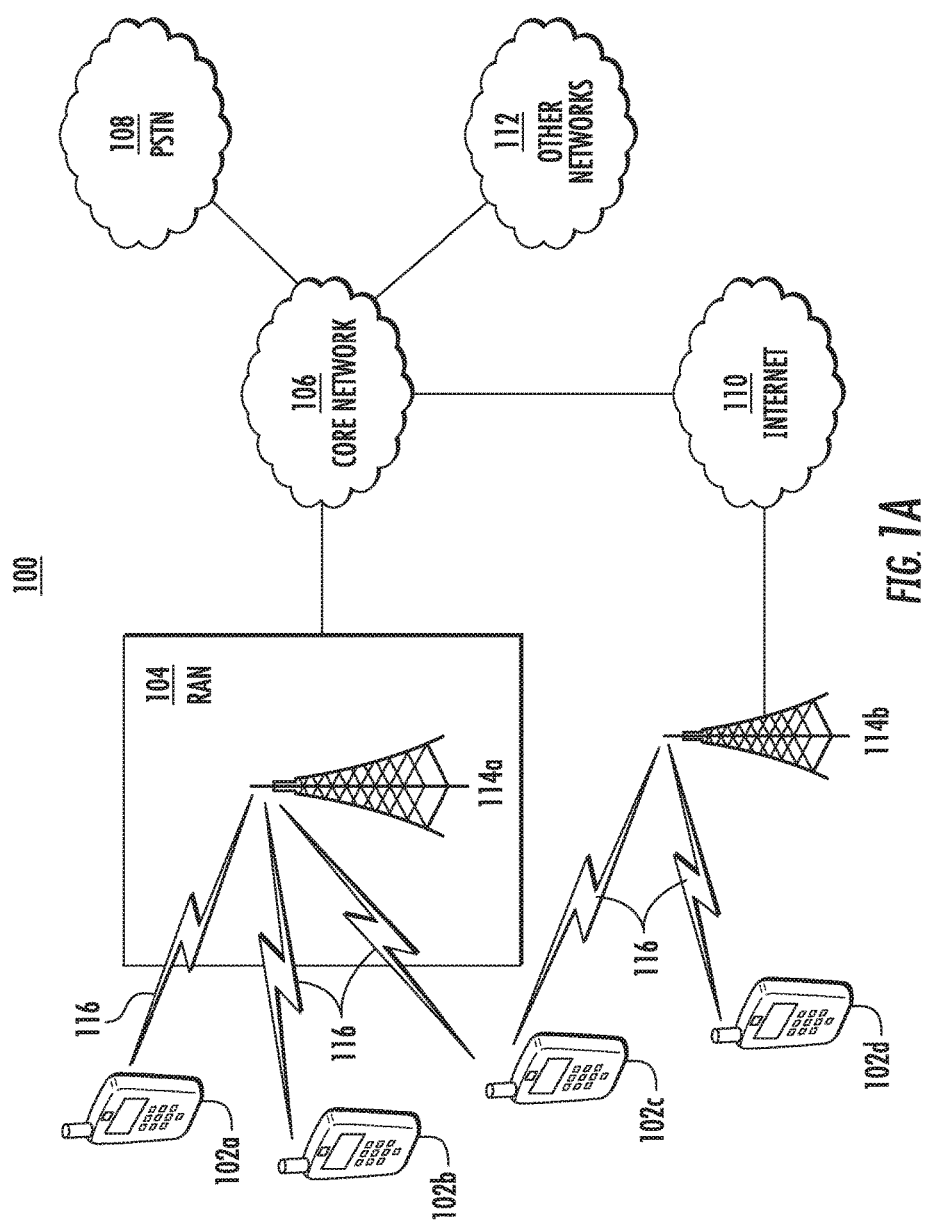
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
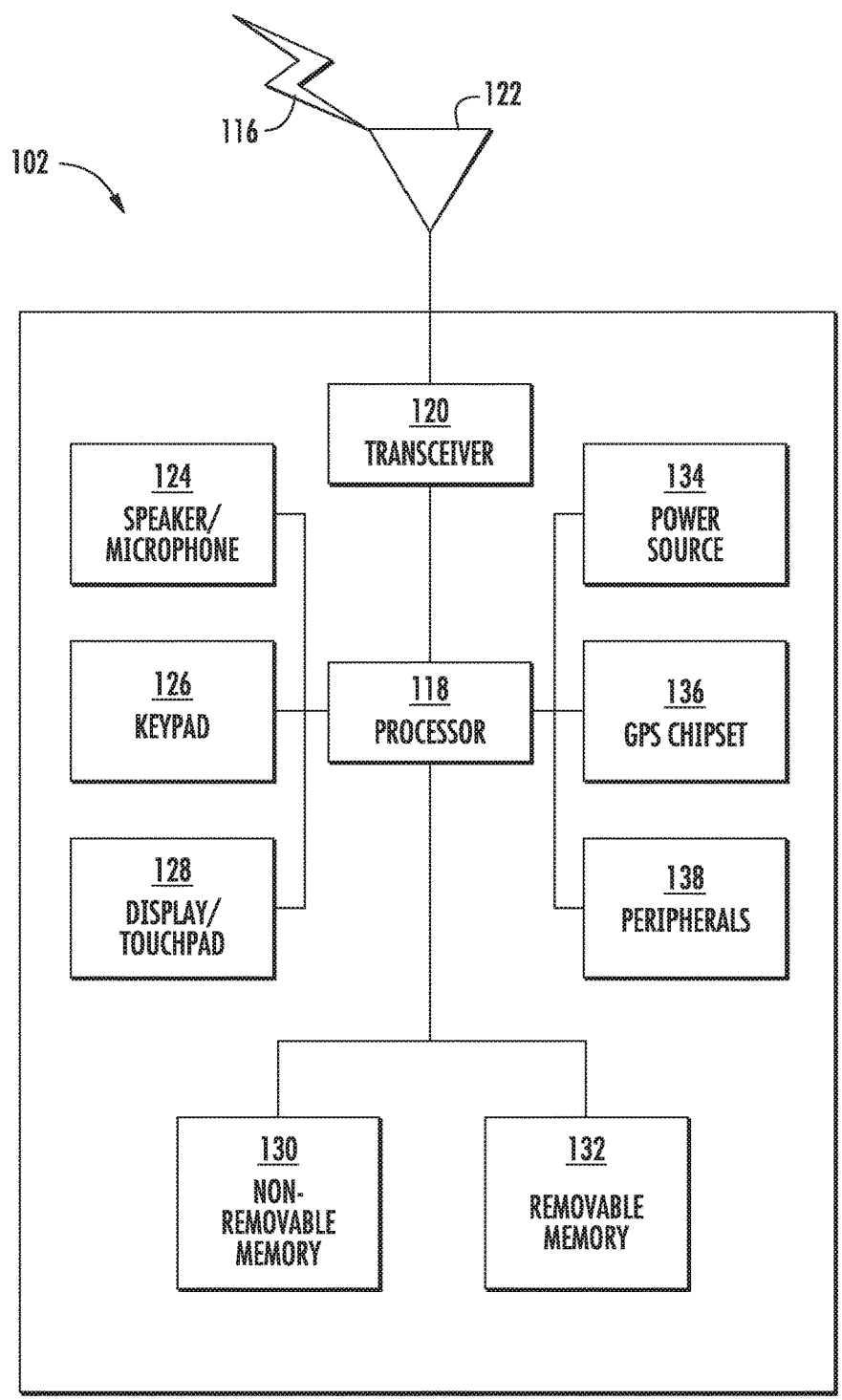
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
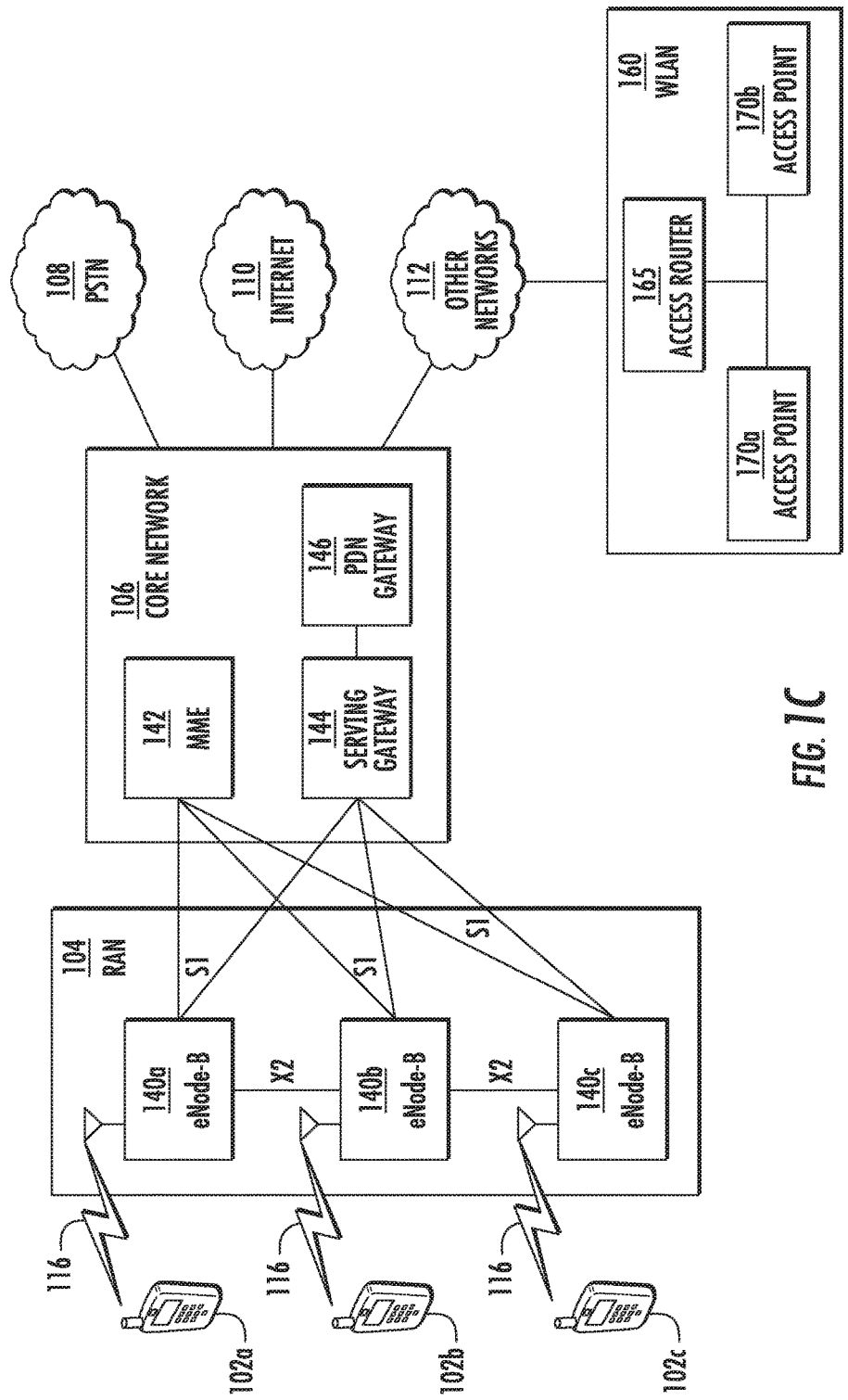
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Orthogonal frequency division multiplexing (OFDM) has been used for LTE and IEEE 802.11 due to its simplicity in mitigating frequency selective channels by converting them into smaller flat fading sub-channels. Discrete Fourier transform spread OFDM (DFT-s-OFDM) may improve the peak-to-average power ratio (PAPR) of OFDM by spreading the data sequence with a DFT before mapping it to sub-carriers at the inverse fast Fourier transform (IFFT) input.

Both OFDM and DFT-s-OFDM use a cyclic prefix (CP) to prevent the inter-symbol interference (ISI) that may occur due to the channel delay spread and timing synchronization errors. The length of the CP may be fixed and dimensioned for the maximum delay spread of the channel. This may result in loss of spectral efficiency when the delay spread of the channel is smaller than the CP duration. Additionally, CP based schemes may result in underutilized symbol energy at the receiver (since the receiver discards the CP part of the symbols), and cause extra power consumption at the transmitter.

Current LTE systems, such as those which may be implemented using devices and systems such as those shown and described with respect to FIGS. 1A, 1B, and 1C, may support two values of the CP: normal and extended CP. The number of OFDM symbols per sub-frame may be 14 for normal CP, and 12 for extended CP. As the CP is configured per cell, the system may lose some spectral efficiency if configured for extended CP and not all the WTRUs in the cell experience the same large delay spread.

Given the potential loss of spectral efficiency due to the lack of flexibility of configuring user specific CP, the CP may be replaced in some cases with an guard interval (GI) which is internal to the inverse discrete Fourier transform (IDFT) window, and acts as a CP, but is configurable without changing the OFDM symbol length.

Solutions that use an internal guard interval may include zero-tail (ZT) DFT-s-OFDM, where the tail of the time domain transmitted signal may be suppressed to almost zero. Some solutions may involve transmitting a deterministic signal, which may be referred to as a Unique Word (UW), instead of the ZT. Some examples may include UW-OFDM and UW-DFT-s OFDM. A high level description of the ZT and UW schemes is further discussed herein.

Figure 2:
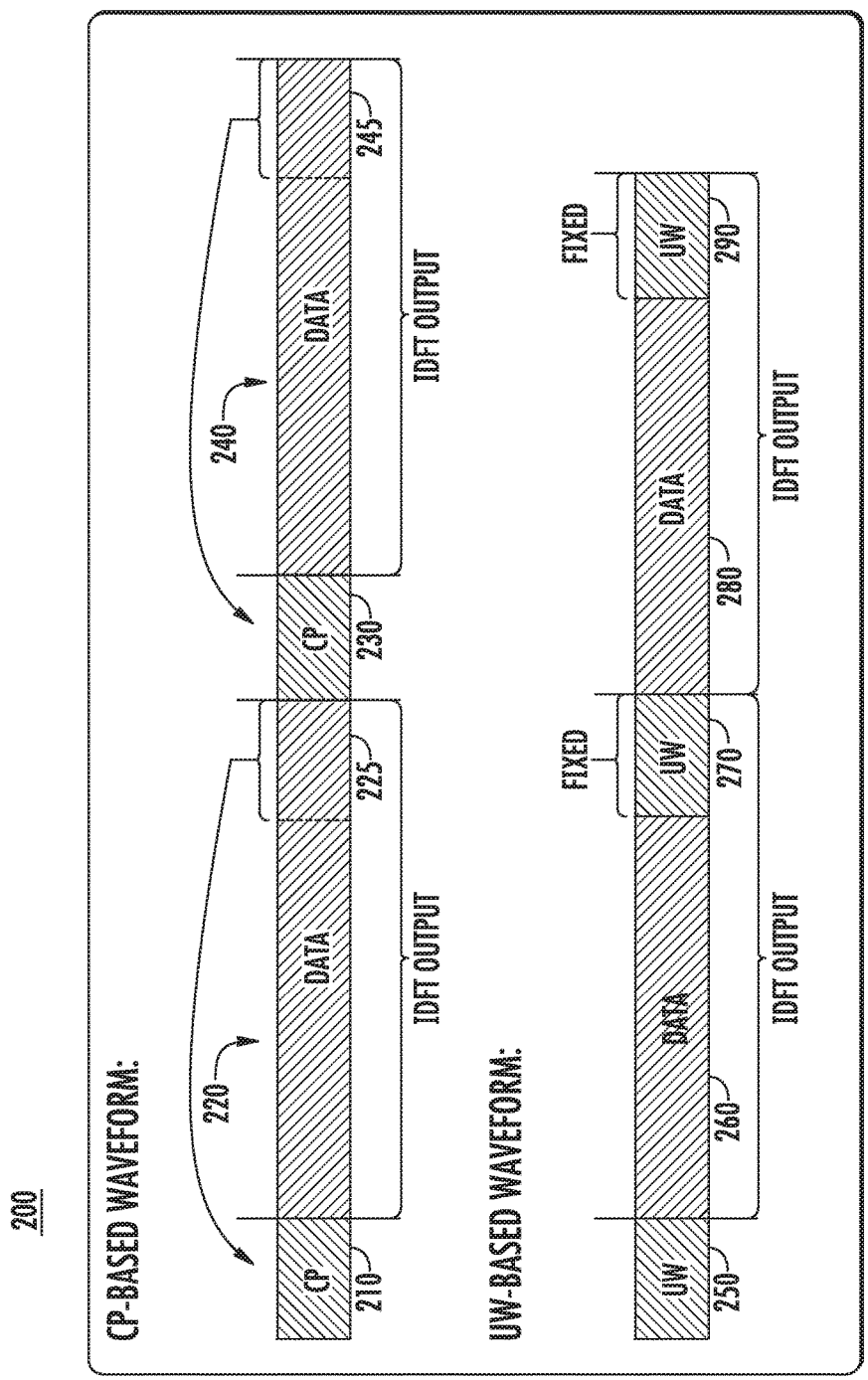
FIG. 2 is a time domain illustration of an example of internal and external guard intervals.

FIG. 2 is a time domain illustration of an example of internal and external guard intervals. As shown in illustration 200, a time domain representation of CP-based waveforms compared to UW/ZT based waveforms illustrates the external guard interval (the CP) versus the internal guard interval (the UW). For example, in a CP-based waveform, CP 210 may proceed data part 220 and CP 230 may proceed data part 240. Each CP may be created by prepending each data symbol with a copy of the end of the data part. For example, CP 210 may be created by prepending a copy of the end 225 of data part 220. Further, CP 230 may be created by prepending a copy of the end 245 of data part 240. CP 210 and data part 220 may be one IDFT output and CP 230 and data part 240 may also be one IDFT output. Further, an IDFT output may be considered to be one useful symbol duration, and the terms may be used interchangeably herein.

Further, in a UW-based waveform, UW 250 may proceed data part 260 and UW 270 may proceed data part 280. Also, UW 290 may proceed further data. Data part 260 and UW 270 may be one IDFT output and data part 280 and UW 290 may be one IDFT output.

The structure in ZT DFT-s-OFDM generates DFT-S-OFDM symbols where its power in the tail of each block in the time domain may be 15-20 decibels (dBs) less than that of the data part. As long as the preceding DFT-S-OFDM symbols follow the same structure, the tail of DFT-S-OFDM may yield the circular convolution of the channel approximately. It may therefore allow frequency domain equalization (FDE) while eliminating the use of CP.

Figure 3:
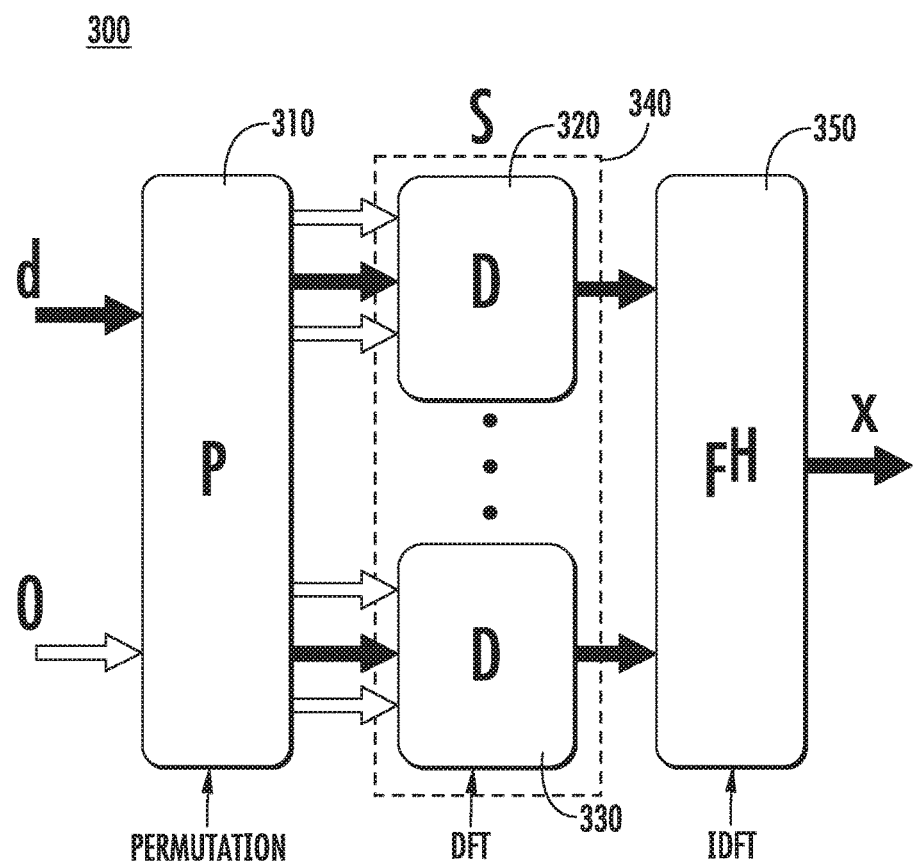
FIG. 3 is a block diagram illustrating an example transmitter structure for Zero Tail (ZT) discrete Fourier transform spread orthogonal frequency division multiplexing (DFT-s-OFDM)

FIG. 3 is a block diagram illustrating an example transmitter structure for ZT DFT-s-OFDM. As shown in an example in block diagram 300, permutation matrix P 310 may receive data vector d and ZT vector 0 to map the elements of d and 0, such as mapping the zeros to first and last inputs of the all of the DFT matrices, to input matrix S block 340. Matrix block 340 may apply multiple DFTs with multiple DFT matrix blocks, such as DFT matrix D block 320 through DFT matrix D block 330. Further, a following IDFT matrix $F^H$ 350 may receive DFT-precoded vectors to generate time domain signal x.

The ZT scheme may rely on the zero symbols at the head and tail of the inputs of DFT spreading blocks. Those zeroes may yield near-zero samples at the tail of the block (output of the IDFT) while allowing leakage from the data part. The obtained tail may serve as a guard interval (GI) between the data part of the OFDM symbols to mitigate inter-symbol interference (ISI) and interferences due to time misalignment between transmitters. In the multi-user case, this scheme also may offer low-complexity adaptive GI utilization by simply placing different numbers of zeroes into DFT-spread blocks. However, this scheme may suffer from tails with a non-zero number of samples which are dependent upon the data transmitted. If the symbols pass through the multipath channel, the non-zero tail of each block may leak into the following symbol and may not maintain the circular convolution of the channel. Hence, the scheme may be inherently interference-limited in multipath scenarios as long as a sophisticated equalizer is not considered at the receiver. In addition, a tail with low power samples may not be preferable at the receiver as it affects automatic gain control and phase tracking performance.

The scheme in UW-OFDM may yield perfect zero samples at the tail of each OFDM symbol and add extra fixed samples, for example, a UW, to the symbol tail. In order to generate exactly zero samples at the tail of each OFDM symbol, this scheme introduces a set of redundant subcarriers.

Figure 4:
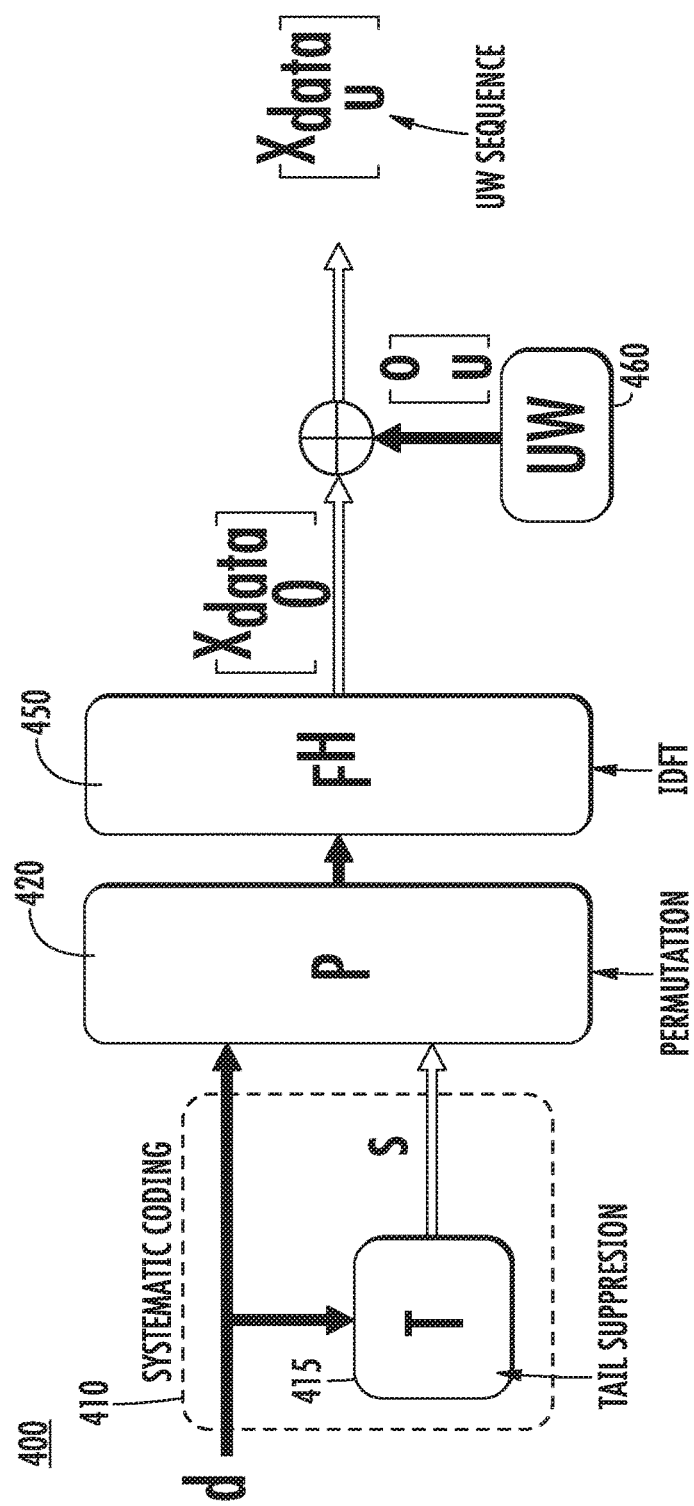
FIG. 4 is a block diagram illustrating an example unique word OFDM (UW-OFDM) transmitter with systematic complex coding.

FIG. 4 is a block diagram illustrating an example UW-OFDM transmitter with systematic complex coding. As shown in an example in block diagram 400, a UW-OFDM scheme may place a vector on redundant subcarriers. For example, a tail suppression block 415 in a systematic coding block 410 may receive data vector d. The redundant subcarriers may then be modulated with values generated by the tail suppression block 415 as illustrated in FIG. 4. Specifically, the tail suppression block 415 may calculate a suppression vector s from data vector d and permutation matrix P 420 may map the elements of s to the redundant subcarriers. As this approach does not distort the data symbols, it may be referred to as systematic complex coding. After the signal $x_{data}$ is generated by IDFT matrix $F^H$ 450, a fixed UW 460, such as, for example, vector u, may be added to the tail of the OFDM symbol. In this way, the UW is added in the time domain at the IDFT output. At the receiver side, the UW may be subtracted after the equalization operation.

Figure 5:
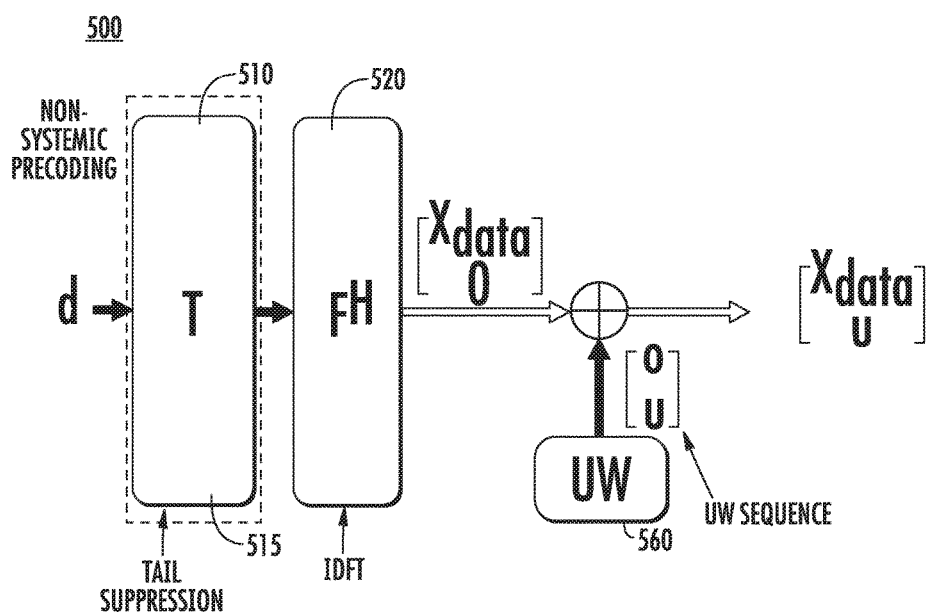
FIG. 5 is a block diagram illustrating an example UW-OFDM transmitter with non-systematic complex coding.

FIG. 5 is a block diagram illustrating an example UW-OFDM transmitter with non-systematic complex coding. As shown in an example in block diagram 500, a tail suppression block 515 in a non-systematic coding block 510 may receive data vector d. After the signal $x_{data}$ is generated by IDFT matrix $F^H$ 520, a fixed UW 560, such as, for example, vector u, may be added to the tail of the OFDM symbol. In this way, the UW is added in the time domain at the IDFT output. As in the example shown in FIG. 4, in the example shown in FIG. 5, at the receiver side, the UW may be subtracted after the equalization operation.

A disadvantage of UW-OFDM may be that the perfect zero tail generator may generate very large values. In other words, the norm of the elements of the vector s may be significantly large, which may translate to high power consumption and distortion due to the quantization errors in practical implementations. In order to avoid this issue, one approach may be to optimize the permutation matrix P, and thereby for example, optimize the location of redundant subcarriers. However, the optimization of P may be a non-deterministic polynomial time (NP)-hard problem and may require exhaustive search among all possible solutions. Heuristic algorithms for P may be available.

In UW-DFT-S-OFDM, a waveform based on DFT-S-OFDM, in which the tail of the DFT-S-OFDM symbol contains a fixed sequence, for example, a UW, may be used. The UW DFT-s OFDM waveform may improve upon both existing ZT DFT-S-OFDM and UW OFDM schemes by removing the impact of data symbols on the tail of the transmitted signal. This may be done by creating a redundant symbol vector that uses 1% of the total transmitted energy approximately.

Figure 6:
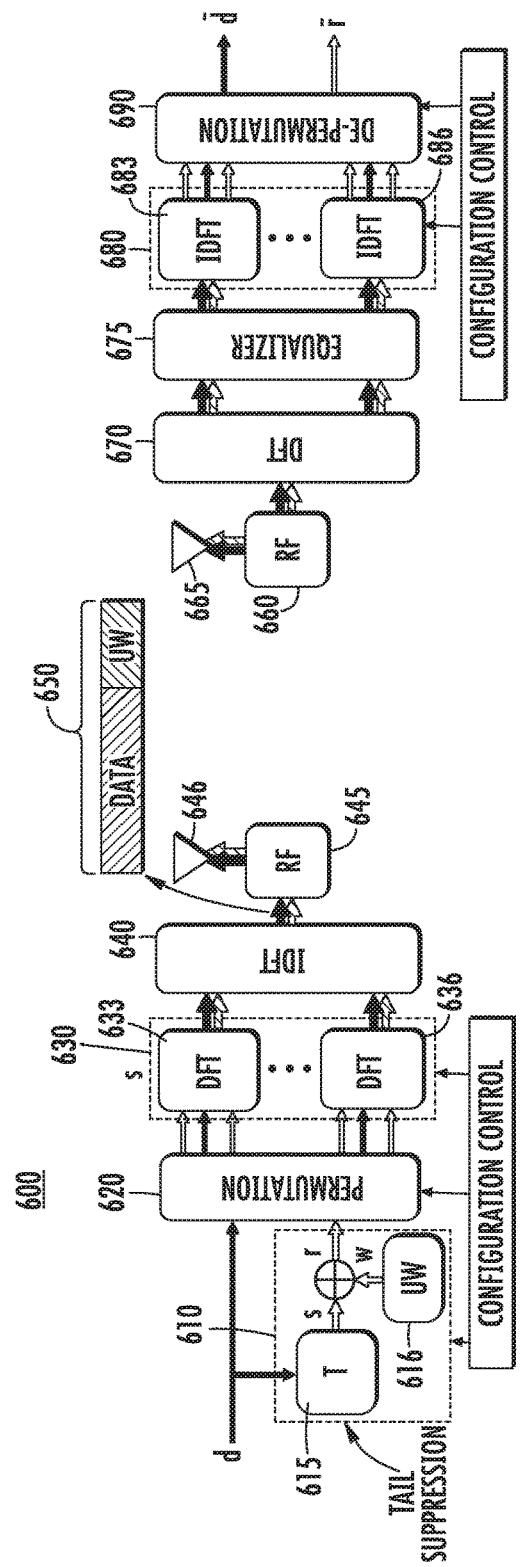
FIG. 6 is a block diagram illustrating an example UW DFT-s-OFDM transmitter and receiver.

FIG. 6 is a block diagram illustrating an example UW DFT-s-OFDM transmitter and receiver. As shown in an example block diagram 600, a tail suppression block 615 in a systematic coding block 610 may receive data vector d, which may also be received by a permutation matrix P 620. As in FIG. 4, redundant subcarriers may then be modulated with values generated by the tail suppression block 615 as illustrated in FIG. 6. Specifically, the tail suppression block 615 may calculate a suppression vector s from data vector d and a fixed UW 616, such as, for example, vector w, may be added to the tail of the suppression vector s to create vector r. Permutation matrix P 620 may map the elements of r to the redundant subcarriers. DFT matrix S block 630 may apply multiple DFT matrix blocks, such as DFT matrix D block 633 through DFT matrix D block 636, to apply spreading. Systematic coding block 610, permutation matrix P 620 and DFT matrix S 630 may perform configuration control. IDFT matrix $F^H$ 640 may generate signal x 650. Signal x 650, composed of a data part and a UW part, may then be transmitted by RF transceiver 645 and corresponding antenna 646.

Further, signal x 650 may then be received by RF transceiver 665 and corresponding antenna 660. A DFT matrix 670 may be applied to the received signal and equalizer 675 may be utilized in frequency domain. Then, IDFT matrix 683 may despread the equalized vector and provide d~ and r~ to de-permutation block 690, which may then output d~ and r~. Further, IDFT matrix 683 and de-permutation block 690 may receive configuration control information to change their parameters.

As a result, the UW DFT-S-OFDM scheme may keep the advantages of UW OFDM and ZT DFT-S-OFDM such as the circular convolution of the channel without the use of a CP, a low peak-to-average power ratio (PAPR), and a low out-of-band (OOB) emission. In addition, the scheme may enable the use of a simpler receiver, because the UW sequence may be inserted at the input of the DFT process, as shown in FIG. 6, as opposed to being added in the time domain at the IDFT output, as in UW-OFDM, as shown in FIG. 4 and FIG. 5. In addition, UW DFT-S-OFDM may allow frequency selective link adaption by adjusting the number of elements in UW sequence. Hence, it may also address the multiple accessing scenarios in the uplink and downlink.

By addition of a UW in a DFT-spread OFDM system, different features of the waveform, such as time domain tail suppression and better frequency containment, may be optimized and/or enhanced. However, the addition of UW may consume a percentage of the system resources that may impact the overhead efficiency of the system. One issue is how to utilize the UW in the transmitted signal to improve the link quality. Various solutions which may extend the use and benefit of the UW are discussed herein.

A typical cellular system includes a well-defined frame structure that allows the system to operate in a synchronous manner. For example, in LTE systems, a radio frame has a 10 millisecond (ms) duration. Each frame includes 10 subframes (or transmission time intervals (TTIs)). Each subframe includes two slots, and each slot includes 7 OFDM symbols when configured for a normal CP. Each symbol contains data samples and CP samples. The selection of CP duration can be determined by a deployment scenario and finite options for a sampling rate. Because UW DFT-S-OFDM does not use a CP, it must be determined how to adapt it to fit an LTE-like frame structure and enable it support shorter TTIs.

In UW DFT-S-OFDM, an UW can be served as a CP to the next OFDM symbol if the mapping from DFT output to the input of IDFT does not change over time. However, if the transmitter changes this mapping between two blocks (e.g., TTIs) of transmission, the time domain sequence of the UW before the change of the mapping will not be the same as the UW after the change of the mapping. This means there would be no CP for the first OFDM symbol of the block of transmission after the change of the mapping. This could cause performance degradation, although the impact may be small.

The UW is a deterministic sequence that may be utilized to enable system procedures such as synchronization, channel estimation for demodulation or measurement of the channel quality. To enable such procedures, the UW and data may be mapped to orthogonal frequency resources. As used in the examples herein, the term data may refer to the coded and modulated symbols for data and/or control information.

In examples described herein using a UW, a TTI may include 15 symbols. However, the examples described herein would also be applicable to TTIs that include a different number of symbols, including a greater number of symbols or a smaller number of symbols. For example and without loss of generality, the examples described herein would also be applicable to TTIs of 7 symbols, 10 symbols, 11 symbols, 12 symbols, 13 symbols, 14 symbols, 20 symbols and the like. Further, in examples described herein a sequence may be generated and a corresponding signal may be transmitted. In some examples described herein a sequence may be used interchangeably with a signal.

Figure 7:
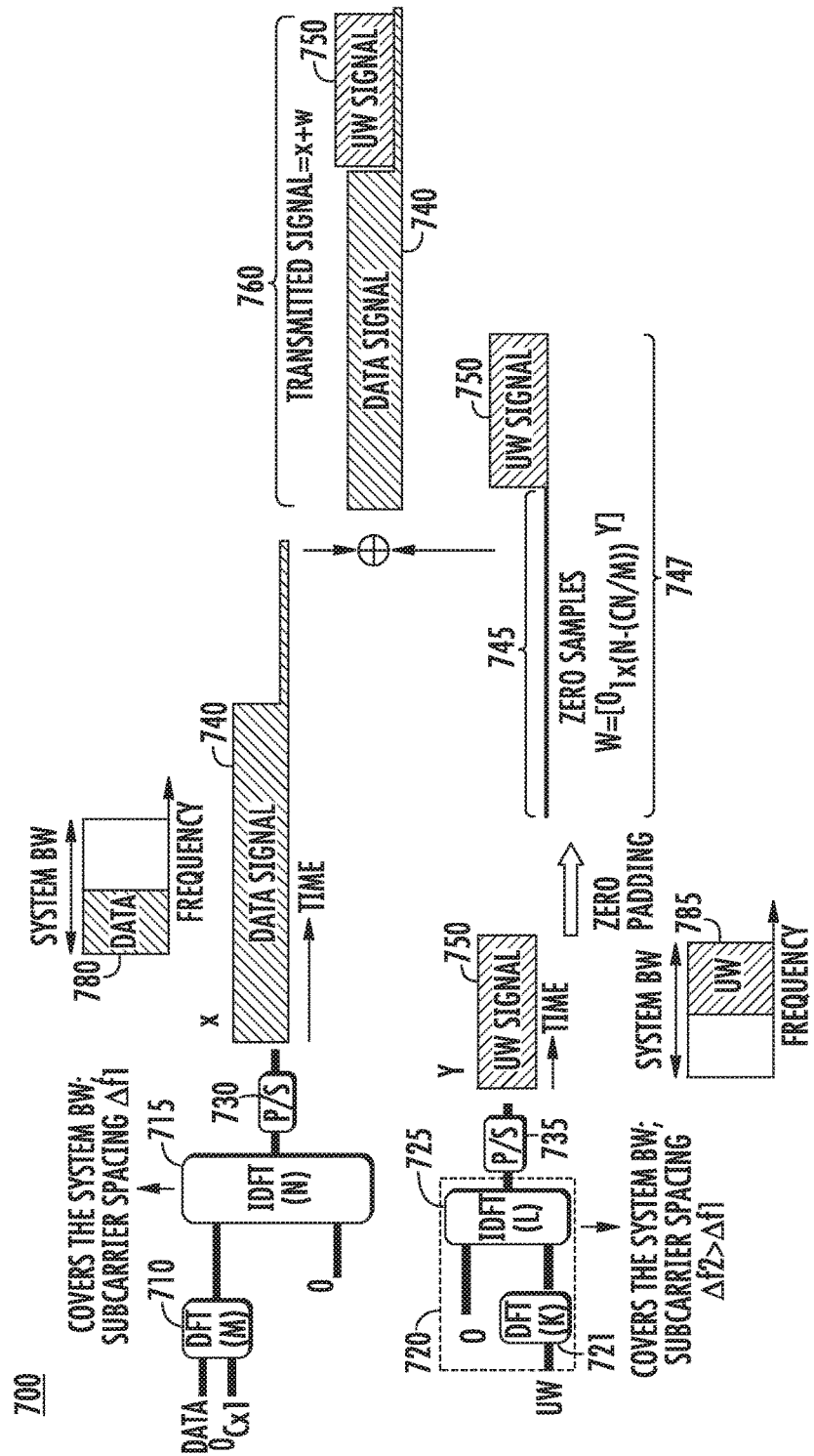
FIG. 7 is a block and signal diagram illustrating an example transmitter structure for data and UW transmission on orthogonal frequency resources.

FIG. 7 is a block and signal diagram illustrating an example transmitter structure for data and UW transmission on orthogonal frequency resources. An example in block and signal diagram 700 shows a proposed solution to map the unique word and data to orthogonal subcarriers, while ensuring that in the time domain, the unique word signal is placed on the (almost) zero tail of the data signal. The proposed solution uses different sub-carrier spacing for the data and the UW.

In FIG. 7, x 740 is a data signal with a length of N samples. To generate the data signal x 740, data symbols may be mapped to a DFT block 710 of size M. The lower portion of the DFT block 710 may be fed with C zeros to generate almost zero samples at the tail of x 740. The length of the almost-zero tail, in this case, is (C*N/M). As an example, if N=1024, M=256, and C=64, then the output signal will have (64/256)×1024=256 samples at the tail that are almost zero. In this configuration, an IDFT block 715 may determine an IDFT size N based on the channel bandwidth and subcarrier spacing Δf1. Also, DFT block 710 may determine DFT size M based on the resource allocation grant, and C may be determined by the zero-tail length, which may be set as a function of the channel delay spread. IDFT block 715 may provide its output to parallel-to-serial (P/S) block 730, which may output data signal x 740.

It is noted that techniques such as using a suppression signal or frequency domain windowing may be incorporated at the transmitter to further suppress the power of the almost-zero samples at the tail of x 740. The tail power shown in FIG. 7 is for illustration purposes only; it may be, e.g., tens of dBs less than the data portion of the signal.

The UW signal may be generated by feeding the UW sequence to a DFT block 721 of size K in a DFT matrix block 720. The size of the DFT block 721 may be determined by the length of the UW sequence. The output of the DFT block 721 may then be fed into K inputs of an IDFT block 725. The IDFT size L and subcarrier spacing Δf2 may be selected such that the system bandwidth $L \times \Delta f2 = N \times \Delta f1$. L may also determine the length of the UW signal y 750. IDFT block 725 may provide its output to P/S block 735, which may output UW signal y 750.

In one example solution, the length of the UW signal y 750 may be selected such that it is equal or slightly smaller than the number of samples at the tail part of the data signal x 740, i.e. $L \leq CN/M$. For example, with N=1024, M=256, C=64, L may be selected as $L=(64/256) \times 1024=256$. In this example, $\Delta f2 = 4 \times \Delta f1$, i.e., while the UW signal may be shorter in time, it has wider subcarrier spacing in frequency. In this solution, the UW signal y 750 of size L is inserted to the tail part of the data signal x 740. One technique to achieve this may be to pad the UW signal with $\{N-(CN/M)\}$ approximately zero samples 745 so that the resulting signal $w=[0_{1 \times \{N-(CN/M)\}} \ y]$ 747 has size N. The transmitted signal 760 thus becomes x+w. The UW signal may be pre-computed and stored in the device memory.

In another example solution, the size of the IDFT blocks may be equal (L=N), and the size of the DFT blocks may also be equal (K=M). In this solution, assuming L/K=p (integer), DFT block on the UW branch may use interleaved sub-carrier mapping to map to IDFT every another p inputs and inserting p−1 zeros between non-zero data. Then the multiple (p) UWs may be generated at the output of IDFT. Only one of them may be added to the tail of the data part. This solution may keep the two branches synchronized, such as, for example, running at the same sampling rate.

In another solution, before the UW signal is added to the data signal, the tail portion of the data signal may be completely zeroed-out, i.e., the samples at the tail (which have very low values) may be set to zero.

To facilitate the use of the UW for synchronization purposes, the data signal and the UW signal may be mapped to non-overlapping subbands within the system bandwidth, for which an example is shown in FIG. 7. Accordingly, the data signal may be mapped to one set of subcarriers 780 and the UW signal may be mapped to another set of subcarriers 785. For example, $m = \Delta f2/\Delta f1 = N/L$, and the indices of the subcarriers in the two branches are $S_1=[0, 1, \ldots N-1]$, and $S_2=[0, 1, \ldots, L-1]$, respectively. If a subcarrier with index $k \in S_2$ is used for UW transmission, then subcarriers with indices (k−1)×m to k×m may not be used for data transmission.

A UW may be used as a sounding reference signal (SRS) in examples described herein. An SRS may be used by the receiver to measure the quality of the channel from the transmitter to the receiver. UW used for channel sounding purposes may be referred to as UW-SRS. UW-SRS may be generated by mapping the UW sequence to the target subbands/subcarriers whose channel quality is to be measured. One example solution to map the UW-SRS sequence to the target subband (that is orthogonal to data transmission) was described hereinabove. In one example solution, the UW-SRS sequence may be mapped to a group of contiguous subcarriers. In another example solution, the UW-SRS may be mapped to interleaved subcarriers in a subband. For example the UW-SRS may be mapped to every kth subcarrier, where k is a configurable parameter.

More than one WTRU may transmit sounding reference signals on the same subband. If the WTRUs map their UW-SRSs to the same subcarriers, then they may be multiplexed by using orthogonal UWs. Alternatively, the WTRUs may map their UW-SRSs to different subcarriers of the subband in an interleaved fashion so that the subcarriers used by different WTRUs are different.

UW-SRS signals may be transmitted only in certain DFT-s-OFDM symbols. As an example, the last DFT-s-OFDM symbol in every n subframes may be used to transmit SRS. The subcarriers used for UW-SRS transmission in consecutive SRS-carrying DFT-s-OFDM symbols may be non-overlapping or partially overlapping.

The resources allocated to UW-SRS transmission (indices of the subbands/subcarriers, indices of the SRS-carrying DFT-s-OFDM symbols, the sequences used as UW, the length of the UW sequence) may be configured by the base station. Alternatively, some or all of this information may be indicated in the control channel.

UW-SRS may be supported for multiple antenna ports. In an example solution, a set of reference signals may be defined by a set of UWs that are time-shifted per antenna port.

Figure 8:
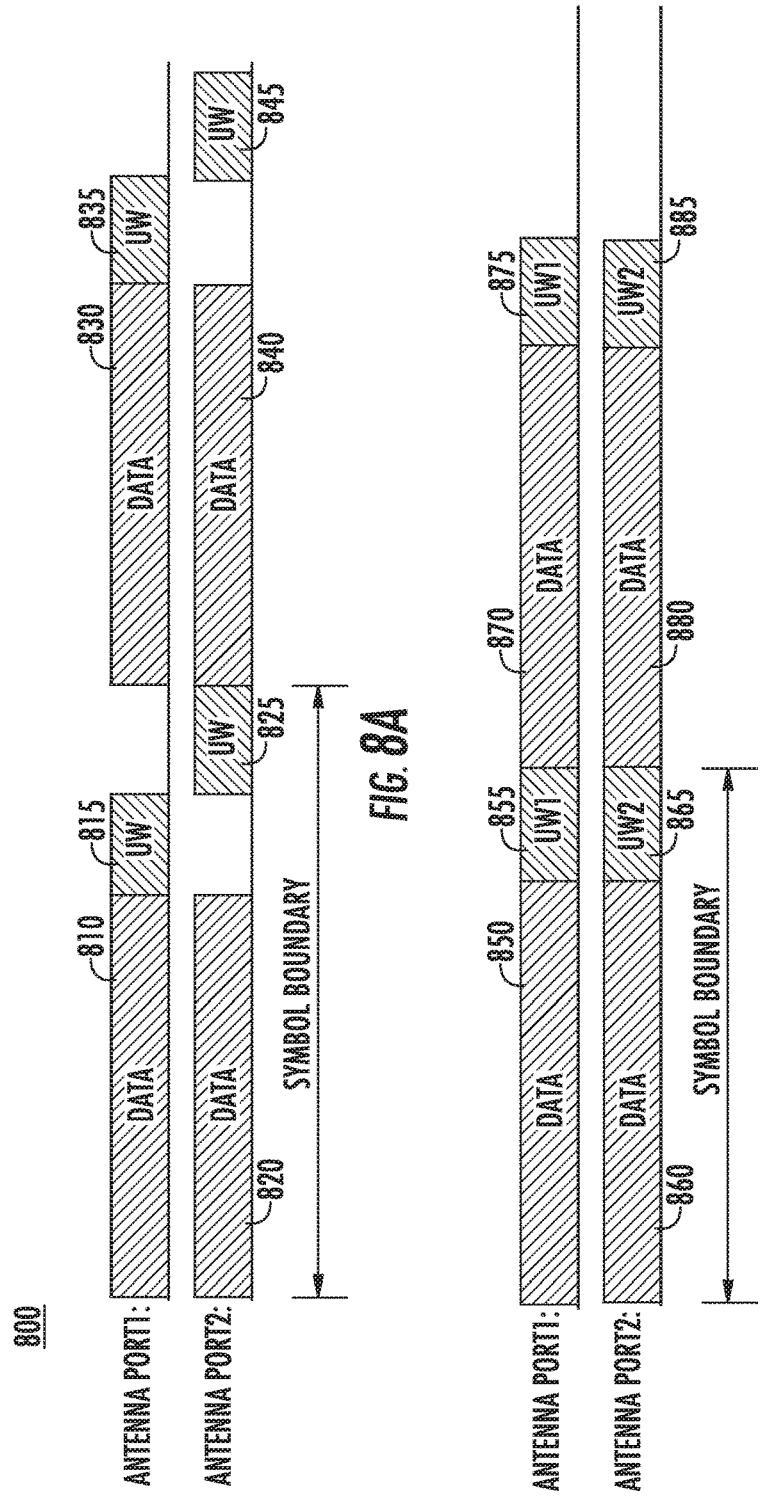
FIGS. 8A and 8B are signal diagrams illustrating example mappings of orthogonal UW-sounding reference signals (SRSs) to multiple antenna ports.

FIG. 8A is a signal diagram illustrating an example mapping of orthogonal UW-SRSs to multiple antenna ports. In an example solution shown in FIG. 8A, each of UWs 815, 825, 835, 845 has an equal length, but may be mapped with a different time offset. For example, UW 815 may follow data part 810 on antenna port 1 and be located within the same symbol boundary as UW 825 which may follow data part 820 on antenna port 2. UW 815 may be mapped with a time offset different from UW 825, as shown. Similarly, UW 835 may follow data part 830 on antenna port 1 and be located within the same symbol boundary as UW 845 which may follow data part 840 on antenna port 2. Accordingly, UW 835 may be mapped with a time offset different from UW 845. Each of the UWs 815, 825, 835, 845 may be identical.

FIG. 8B is a signal diagram illustrating another example mapping of orthogonal UW-SRSs to multiple antenna ports. In an example solution shown in FIG. 8B, a different UW may be selected per antenna port such that each selected UW is orthogonal to that of the other antenna port. As an example, such set of UWs, such as UWs may be defined based on a set of complex sequences with good correlation properties, such as Zadoff-Chu (ZC). In an exemplary set up, the set may be comprised of different cyclic shifts of the same root of a ZC sequence.

For example, UW1 855 may follow data part 850 on antenna port 1 and be located within the same symbol boundary as UW2 865 which may follow data part 860 on antenna port 2. UW1 855 may be mapped with the same time offset as UW2 865, as shown. UW1 855 may be different than UW2 865. Similarly, UW1 875 may follow data part 870 on antenna port 1 and be located within the same symbol boundary as UW2 885 which may follow data part 880 on antenna port 2. UW1 875 may be mapped with the same time offset as UW2 885, as shown. As shown in signal diagram 800, FIG. 8A may be considered to be a special case of FIG. 8B, where UW 815 and UW 825 have special structures.

A band limited UW signal may be designed to be used as a synchronization signal, and may be referred to as the UW-Synch signal. In initial synchronization, it may be desirable to have high power efficiency. If the transmitted synchronization signal is narrowband, the receiver may first filter the incoming signal, down-sample it, and search for the synchronization signal. Searching, for example with a correlator, by using a down-sampled signal may be a more power efficient operation. As an example, for a 20 megahertz (MHz) channel, the UW sequence may be designed such that it is transmitted on a 1.25 MHz subband in the center of the channel. The transmitter architecture illustrated in FIG. 7 may be used for this purpose.

Figure 9:
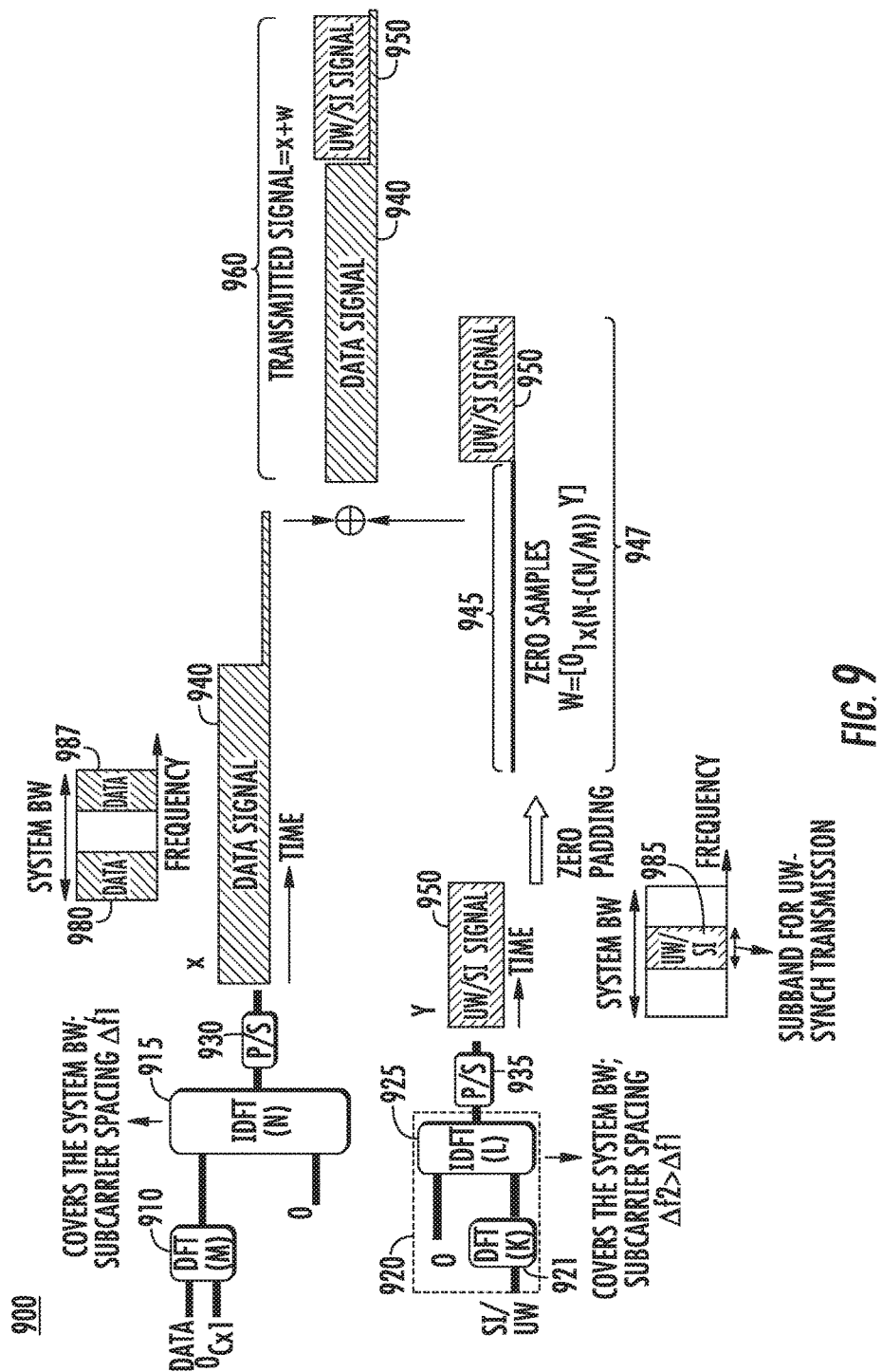
FIG. 9 is a block and signal diagram illustrating an example of simultaneous transmission of UW-synchronization signal and system information (SI)

FIG. 9 is a block and signal diagram illustrating an example of simultaneous transmission of UW-synchronization signal and system information (SI). In an example method shown in block and signal diagram 900, some SI and a UW may both be transmitted as part of a synchronization signal. The SI may consist of a several bits of information about the system.

In a manner similar to the example shown in FIG. 7, in an example shown in FIG. 9, x 940 is a data signal with a length of N samples. To generate the data signal x 940, data symbols may be mapped to a DFT block 910 of size M. The lower portion of the DFT block 910 may be fed with C zeros to generate almost zero samples at the tail of x 940. The length of the almost-zero tail, in this case, is (C*N/M). As an example, if N=1024, M=256, and C=64, then the output signal will have (64/256)×1024=256 samples at the tail that are almost zero. In this configuration, an IDFT block 915 may determine an IDFT size N based on the channel bandwidth and subcarrier spacing Δf1. Also, DFT block 910 may determine DFT size M based on the resource allocation grant, and C may be determined by the zero-tail length, which may be set as a function of the channel delay spread. IDFT block 915 may provide its output to P/S block 930, which may output data signal x 740.

In a manner different from the example shown in FIG. 7, in the example shown in FIG. 9, the UW signal may be generated by feeding both the UW sequence and SI to a DFT block 921 of size K in an IDFT block of size L 920. The size of the DFT block 921 may be determined by the length of the UW/SI sequence. The output of the DFT block 921 may then be fed into K inputs of an IDFT block 925. The IDFT size L and subcarrier spacing Δf2 may be selected such that the system bandwidth L×Δf2=N×Δf1. L may also determine the length of the UW/SI signal y 950. IDFT block 925 may provide its output to P/S block 935, which may output UW/SI signal y 950.

In one example solution, the length of the UW/SI signal y 950 may be selected such that it is equal or slightly smaller than the number of samples at the tail part of the data signal x 940, i.e. L≤CN/M. For example, with N=1024, M=256, C=64, L may be selected as L=(64/256)×1024=256. In this example, Δf2=4×Δf1, i.e., while the UW/SI signal may be shorter in time, it has wider subcarrier spacing in frequency. In this solution, the UW/SI signal y 950 of size L is inserted to the tail part of the data signal x 940. One technique to achieve this may be to pad the UW/SI signal with {N−(CN/M)} approximately zero samples 945 so that the resulting signal $w=[0_{1\times\{N-(CN/M)\}}\ y]$ 947 has size N. The transmitted signal 960 thus becomes x+w. The UW/SI signal may be pre-computed and stored in the device memory.

To facilitate the use of the UW for synchronization purposes, the data signal and the UW/SI signal may be mapped to non-overlapping subbands within the system bandwidth, for which an example is shown in FIG. 9. Accordingly, the data signal may be mapped to sets of subcarriers 980 and 987 and the UW/SI signal may be mapped to another set of subcarriers 985. In this way, the UW/SI signal may be mapped to the center of the band, which may be generally useful for initial access scenario before learning the actual bandwidth of the system.

Figure 10:
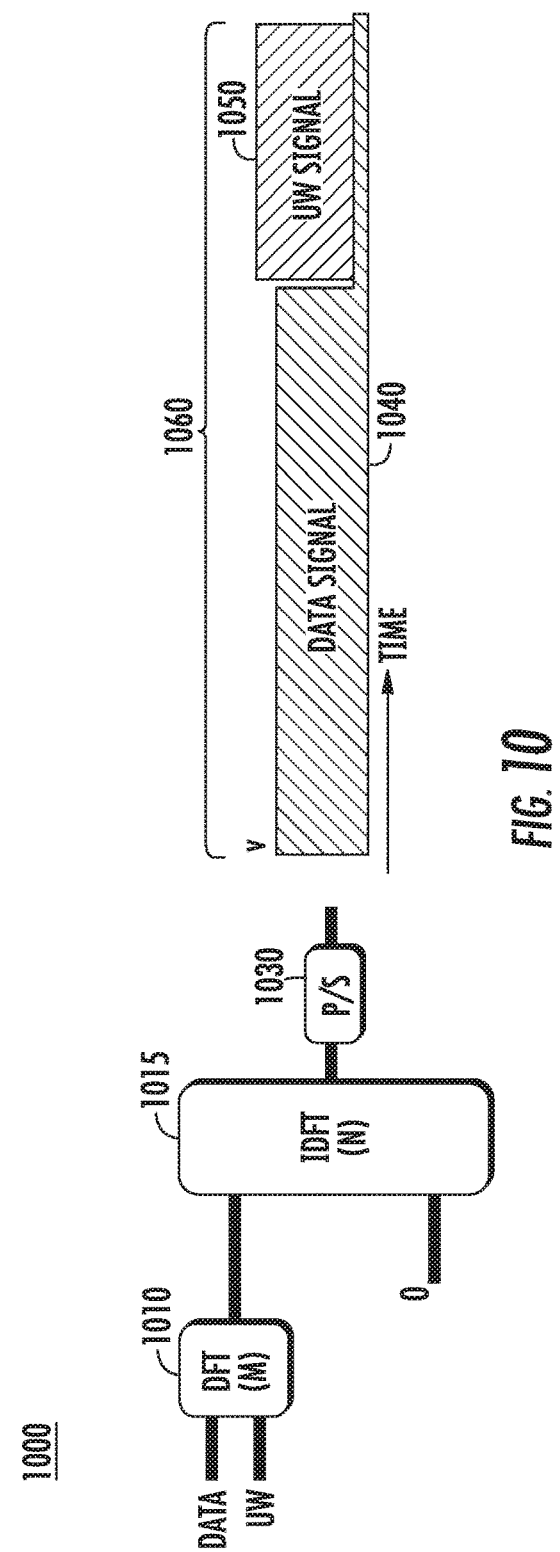
FIG. 10 is a block and signal diagram illustrating an example of UW transmission as part of the data signal.

FIG. 10 is a block and signal diagram illustrating an example of UW transmission as part of the data signal. The UW sequence may be mapped to the DFT input to DFT block 1010 together with the data as shown in block and signal diagram 1000. Further, an IDFT block 1015 may be an IDFT size N. IDFT block 1015 may provide its output to P/S block 1030, which may output signal v 1060. As a result, transmitted signal v 1060 may be generated, composed of data signal 1040 and UW signal 1050.

In this case, the data and UW may be transmitted in the same frequency band. At the receiver side, the UW may be used to enhance synchronization such as for enhance timing, and frequency synchronization, phase tracking, and the like.

The UW-Synch signal may be transmitted on certain DFT-s-OFDM symbols. For example, it may be transmitted on all DFT-s-OFDM symbols in specific subframes, or it may be transmitted on specific DFT-s-OFDM symbols in a frame.

Figure 11:
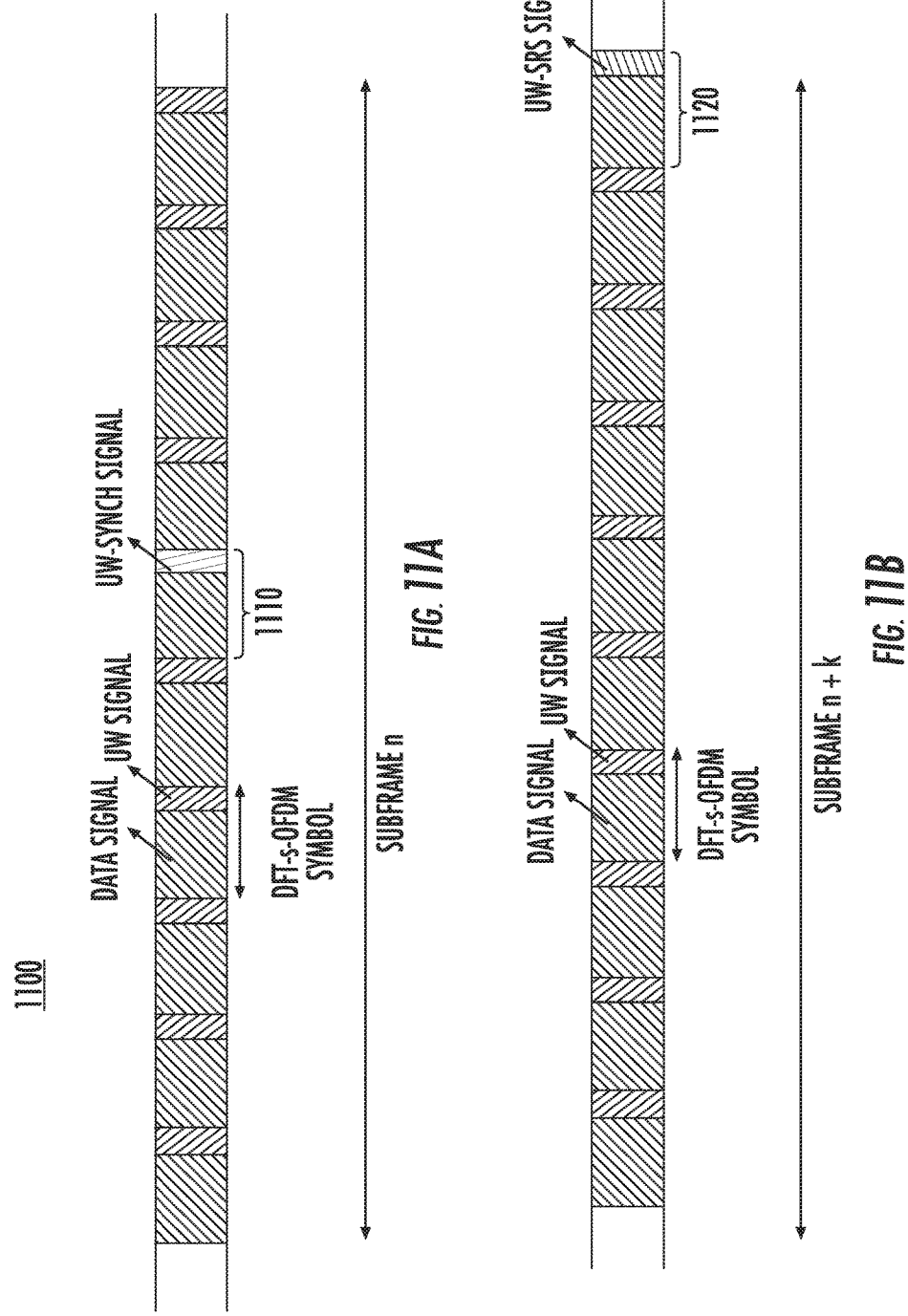
FIG. 11A is a signal diagram illustrating an example of time multiplexing of various UW signals.
FIG. 11B is a signal diagram illustrating another example of time multiplexing of various UW signals.

FIG. 11A is a signal diagram illustrating an example of time multiplexing of various UW signals. An example of transmitting the UW-Synch signal on specific DFT-s-OFDM symbols in a frame is shown in FIG. 11A, where the UW-Synch signal is transmitted in the $6^{th}$ DFT-s-OFDM symbol 1110 of subframe n.

FIG. 11B is a signal diagram illustrating another example of time multiplexing of various UW signals. FIG. 11B shows another example of transmitting the UW-Synch signal on specific DFT-s-OFDM symbols in a frame. As shown in FIG. 11B, a UW-SRS signal may be transmitted in the last DFT-s-OFDM symbol 1120 of subframe n+k. The other UW signals in subframes n and n+k may map the UW sequence and data to the same DFT block as shown in FIG. 11A and FIG. 11B.

In one example, the multiplexing pattern shown in signal diagram 1100 may be configured by a controller (such as a base station), among other things, to adapt the frequency of the transmission of the UW-Synch and/or UW-SRS to improve channel estimation and/or link adaptation. In another example, to enable communications between mobile terminals without a central controller, the mobile may autonomously determine the multiplexing pattern, and/or the UW-synch and UW-SRS sequences.

Figure 12:
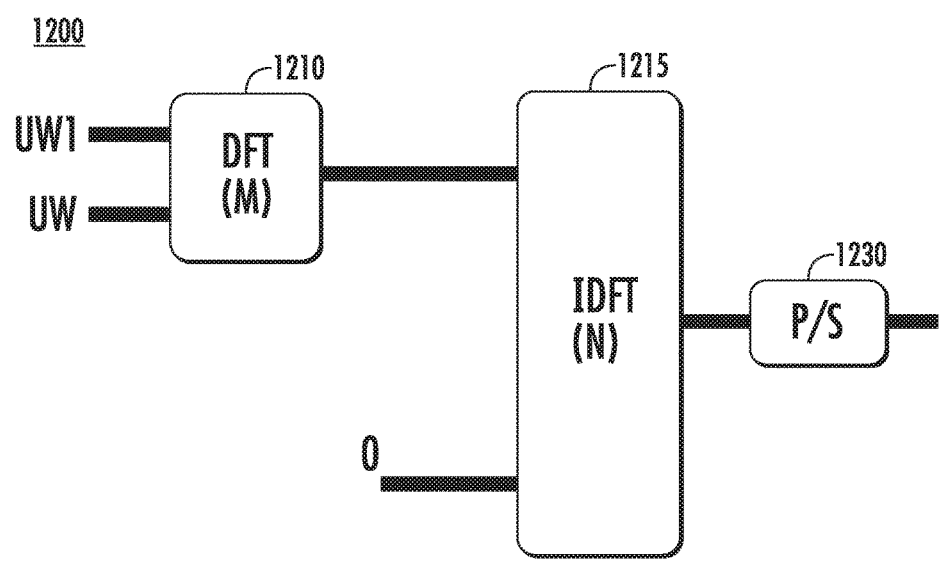
FIG. 12 is a block diagram illustrating an example of one or more UWs used as a data demodulation reference signal.

FIG. 12 is a block diagram illustrating an example of one or more UWs used as a data demodulation reference signal. Where another deterministic sequence is used as an input to the DFT block instead of data, as shown in block diagram 1200, a reference signal for data demodulation may be formed (UW DM-RS). In the example of FIG. 12, UW1 represents the sequence that may be used as reference for data demodulation purposes. The reference UW1 sequence spans the same set of sub-carriers (M sub-carriers) as the data symbols. As shown in FIG. 12, UW and UW1 are mapped to the DFT input to DFT block 1210. Further, an IDFT block 1215 may be an IDFT size N. As a result, a signal composed of UW and UW1 may be generated. Further, IDFT block 1215 may provide its output to P/S block 1215, which may output the signal.

The UW-DFT-s-OFDM symbols carrying data (as shown in FIG. 10) and the UW DFT-s OFDM symbols carrying data demodulation reference signals (as shown in FIG. 12) may be multiplexed in time during a sub-frame. The location(s) of the UW DM-RS symbols within a sub-frame may be predefined, or may be configurable.

In order to demonstrate the channel estimation based on a single UW DFT-S-OFDM symbol shown in FIG. 10, let $r_f = P_{subband} F v \in \mathbb{C}^{M\times 1}$ be the received data symbol in frequency. In this expression, $P_{subband} \in \mathbb{C}^{M\times N}$ is the permutation matrix that selects the subband of interest, $F \in \mathbb{C}^{N\times N}$ is the discrete Fourier transform (DFT) matrix of size N and $v \in \mathbb{C}^{N\times 1}$ is the received signal in the time domain. If the received signal is equalized with FDE perfectly, the UW sequence needs to appear at the lower end of the de-spreading operation (for example, IDFT) as:

$$u = A(r_f) S h_s \qquad \text{Equation (1)}$$

Here, $h_s \in \mathbb{C}^{M_h \times 1}$ is the vector that generates the inverse of the channel frequency response on the subband of interest after being multiplied with the smoothing matrix $S \in \mathbb{C}^{M \times M}$, $u \in \mathbb{C}^{C \times 1}$ is the UW sequence, C is the length of UW sequence, and $A(r_f) \in \mathbb{C}^{C \times M_h}$ is the combined matrix explicitly given by:

$$A(r_f) = P_{UW} D^H \text{diag}\{r_f\} \qquad \text{Equation (2)}$$

Here, $D \in \mathbb{C}^{M \times M}$ is the M-point DFT, $P_{UW} \in \mathbb{C}^{C \times M}$ is the permutation matrix that only selects the UW sequence, $(\bullet)^H$ is the Hermitian operation and diag$\{\bullet\}$ is the operator that generate a diagonal matrix where the its diagonal is the argument. Since Equation (1) is linear, the vector $h_{FDE}$ may be estimated by using minimum mean square error (MMSE), zero-forcing (ZF), or maximum likelihood (ML). As example, if ZF is considered in the estimation, the vector $h_s$ is obtained as $$h_s = (A(r_f)S)^{\dagger} u \qquad \text{Equation (3)}$$

Here, $(\bullet)^{\dagger}$ is the pseudoinverse operation. Note that the smoothing matrix S may be selected as:

$$S = P_{subband} F_p \qquad \text{Equation (4)}$$

Here, $F_p \in \mathbb{C}^{M_h \times N}$ includes the first $M_h$ column of matrix F. $\mathbb{C}$ As example, if there are 8 samples for a UW sequence and the number of resolution points in frequency domain is 8, the size of $(A(r_f)S)^{\dagger}$ becomes 8×8. Hence, the channel estimation may be done with less receiver complexity.

Examples of UW-DM-RS configuration for multi-antenna transmission are further discussed herein. A WTRU may be configured to use one or multiple UW sequences for multi-antenna transmission, for example for multi-antenna precoding including spatial multiplexing. Since spatial multiplexing requires one DM-RS signal per layer, the WTRU may be required to be able to transmit multiple DM-RS signals. For example, in an example case where the WTRU is configured to transmit four spatially multiplexed layers in parallel, there may be a need for four DM-RS signals to be transmitted from the same WTRU.

In an example solution, a different UW may be selected per layer such that each selected UW is orthogonal to that of the other layer. As an example, such set of UWs may be defined based on a set of complex sequences with good correlation properties, such as ZC or Golay sequences. In an exemplary set up, the set may be comprised of different cyclic shifts of the same root of a ZC sequence.

In another example solution, a same UW may be applied to all layers, however different cover code per layer may be applied to allow separation of the UW for each layer at the receiver.

UW sequences may be configured for DM-RS in a number of ways. For DM-RS based coherent demodulation, the bandwidth of the reference signal may be equal to the bandwidth of the corresponding data transmission. As a result, the length of the UW used by the WTRU may change, based on the bandwidth of the data transmission.

A WTRU may be configured semi-statically through radio-resource control (RRC) signaling to use a fixed or limited set of UW sequences (of fixed or different lengths) in order to limit the control overhead.

A WTRU may be configured semi-statically through RRC signaling to utilize reference signals created from the same UW sequence, for example, by applying mutually orthogonal patterns, such as [+1, +1] and [+1, −1], in order to combat interference between the reference signals.

A WTRU may be configured dynamically through L1/L2 control signaling to utilize a set of UW sequences, and may be configured to utilize a different UW sequence for each spatially multiplexed layer.

In examples described herein, a UW may be used to provide analog feedback. In an example system, such as an example closed-loop precoding system, a WTRU may perform measurements on the downlink reference signals and/or may report the measured channel information, which may include channel quality information (CQI), rank indicator (RI) and/or precoding matrix indicator (PMI). The WTRU may report the measured channel information to the base station. The reported PMI and CQI may be quantized, for example to reduce feedback overhead.

In an example solution, a WTRU may perform measurement on the downlink reference signals to estimate the channel direction matrix $U_{DL}$, and/or use the measured channel $U_{DL}$ or its estimated eigen direction to beamform a reference vector $x_{UW}$ (that may be defined based on a selected UW), for example rather than quantizing the channel direction information and reporting it as a PMI. In this solution, the signal received at the eNode-B may be expressed as:

$$r = H_{UL} U_{DL} x_{UW} + n \qquad \text{Equation (5)}$$

Here, n is the additive Gaussian noise. The eNB may use the reference vector $x_{UW}$ and the UL channel estimate $\hat{H}_{UL}$ to determine an estimate of the actual beamforming vector used by the WTRU, and estimate the DL channel direction as observed by the WTRU. An exemplary approach for determination of $\hat{U}_{DL}$ may be based on the ZF method:

$$\hat{U}_{DL} = (\hat{H}_{UL})^{\dagger} r (x_{UW})^{\dagger} \qquad \text{Equation (6)}$$

Here, $(\bullet)^{\dagger}$ is the pseudo inverse function.

A different UW may be selected per layer such that each selected UW may be orthogonal to that of the other layer. As an example, such set of UWs may be defined based on a set of complex sequences with good correlation properties, such as ZC. In an exemplary set up, the set may be comprised of different cyclic shifts of the same root of a ZC sequence.

In another example solution, a same UW may be applied to all layers, however different cover code per layer may be applied to allow separation of the UW for each layer at the receiver.

Examples of handling of changes in the UW are discussed herein. For example, if the WTRU transmits in a bursty mode, with, for example, no transmission periods before a transmission starts, the first DFT-s-OFDM symbol may not have a UW preceding it.

Figure 13:
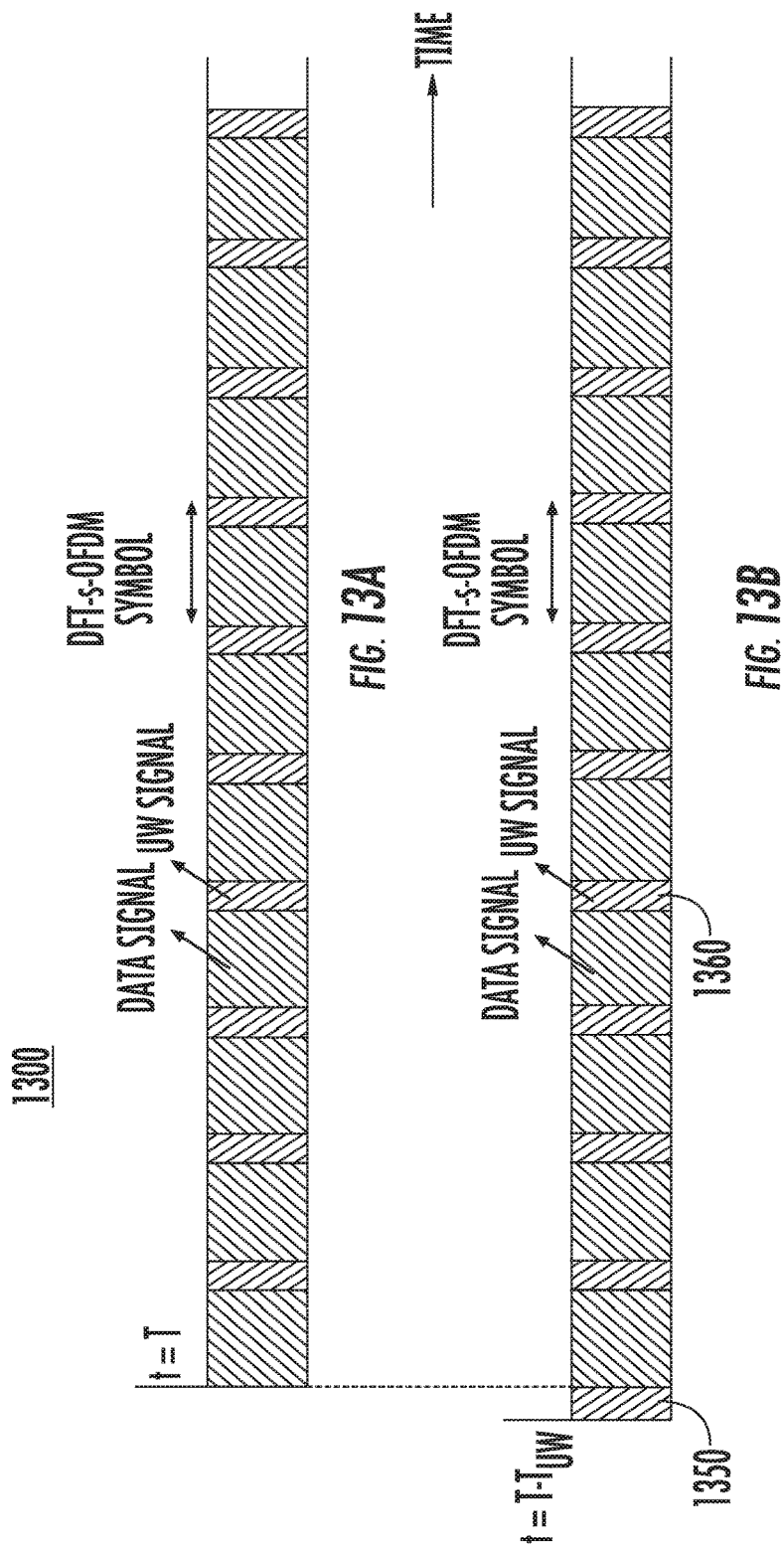
FIGS. 13A and 13B are signal diagrams illustrating bursty transmission with UW.

FIGS. 13A and 13B are signal diagrams illustrating bursty transmission with UW. An example is shown in FIG. 13A where the transmission starts at time t=T. Due to the lack of a cyclic prefix, circular convolution with the channel will be lost, resulting in possible inter-carrier interference. To prevent this, a cyclic prefix 1350 may be appended to the first DFT-s-OFDM symbol, as shown in FIG. 13B. In an example shown in signal diagrams 1300, the cyclic prefix 1350 may be a copy of the UW signal, such as UW signal 1360. In this case, transmission starts at time t=T−$T_{UW}$ where $T_{UW}$ is the duration of the UW signal in seconds.

Examples of handling a change of the UW during a transmission is further discussed herein. The UW lengths and signals may sometimes differ in consecutive DFT-s-OFDM symbols. For example, at certain DFT-s-OFDM symbols, UW-SRS or UW-Synch signals may be transmitted. Due to the change of the UW signal, inter-symbol interference and inter-carrier interference may occur.

Figure 14:
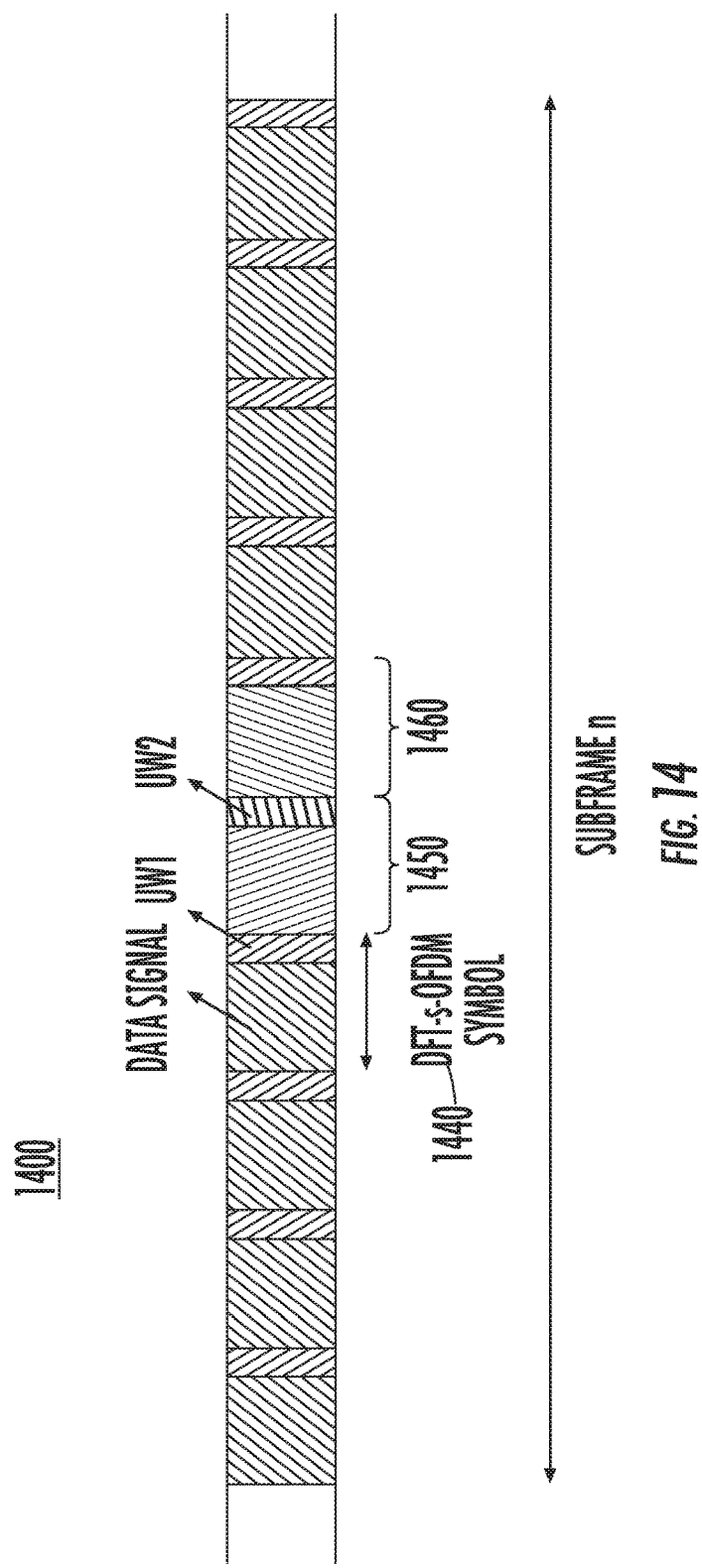
FIG. 14 is a signal diagram illustrating an example of UW transitions with a change of the UW signal.

FIG. 14 is a signal diagram illustrating an example of UW transitions with a change of the UW signal. An example of a change in the UW signal is shown in signal diagram 1400, where the fifth DFT-s-OFDM symbol 1450 and sixth DFT-s-OFDM symbol 1460 may experience interference due to the transition from UW1 to UW2, and from UW2 back to UW1. For example, UW1 may be used in DFT-s-OFDM symbol 1440 and again in DFT-s-OFDM symbol 1460, while UW2 may be used between them in DFT-s-OFDM symbol 1450.

These transitions from one UW to another may be predefined in time, for example, if they are due to transmission of a UW-SRS or UW-Synch transmission. The receiver may know when to expect a transition if it has acquired correct timing. One way to reduce the impact of the interference may be to introduce a guard interval at the beginning of the data portion of the DFT-s-OFDM symbols that may experience interference. This may be achieved by feeding zeros to the head of the DFT block, as shown in FIG. 15.

Figure 15:
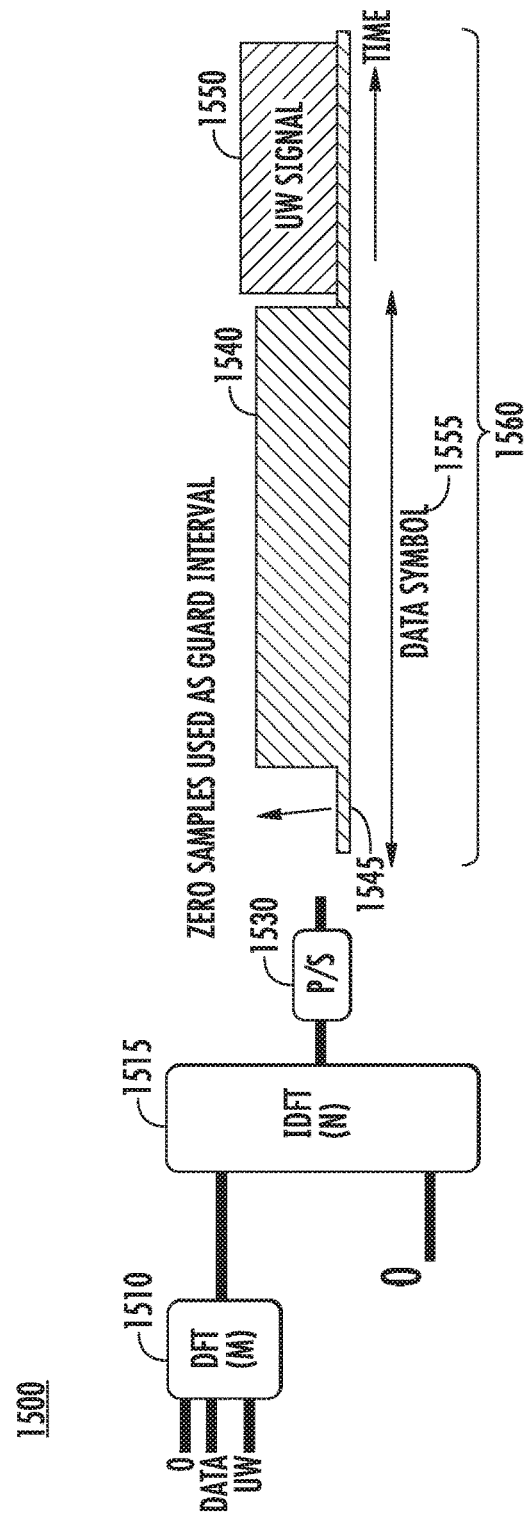
FIG. 15 is a signal diagram illustrating example UW DFT-s-OFDM symbol generation with a guard interval.

FIG. 15 is a signal diagram illustrating example UW DFT-s-OFDM symbol generation with a guard interval. As shown in an example in signal diagram 1500, the number of zeros fed into the head of the DFT block 1510 may be configured. Since these zeros may reduce the number of resources that may be used for data transmission, the transport block size or coding rate may need to be changed. At the receiver size, the receiver may discard the time-domain samples that are used as guard interval. As an example, with DFT size M=256, IDFT size N=1024, and $N_h$=16 zeros at the head of the DFT block, $N_h$ N/M=64 samples at the beginning of the time domain signal may be discarded by setting them to zero before taking N-point DFT at the receiver.

As shown in FIG. 15, a configured number of zeros, the data and a UW may be fed into DFT block 1510. Further, an IDFT block 1515 may determine an IDFT size N. As a result, transmitted signal 1560 may be generated, composed of data symbol 1555 and UW signal 1550. Further, IDFT block 1515 may provide its output to P/S block 1530, which may output the signal 1560. Data symbol 1555 may be composed of data signal 1540 and zero samples 1545 used as a guard interval.

It is noted that if the UW is set to zeros, then the power spent on the transmission of the UW may be used to boost the power of the data transmission. For example, UW signal 1550 is set to zero, the power of the data signal 1540 may be boosted.

Examples of joint preamble/demodulation reference signals (DMRS) and UW design for channel estimation and tracking, and handling changes in the UW are further discussed herein.

In one example, which addresses robust channel estimation for UW-based waveforms and handling changes in UW in the frame, a joint DMRS and UW design, which generates a UW sequence based on the sequence for the DMRS sequence in frequency, is considered. Accordingly, the UW sequence and DMRS sequence may be dependent in this example solution. For example, the UW sequence may be a function of the DMRS sequence. In another example, the UW signal may appear in the DMRS signal multiple times.

Figure 16A:
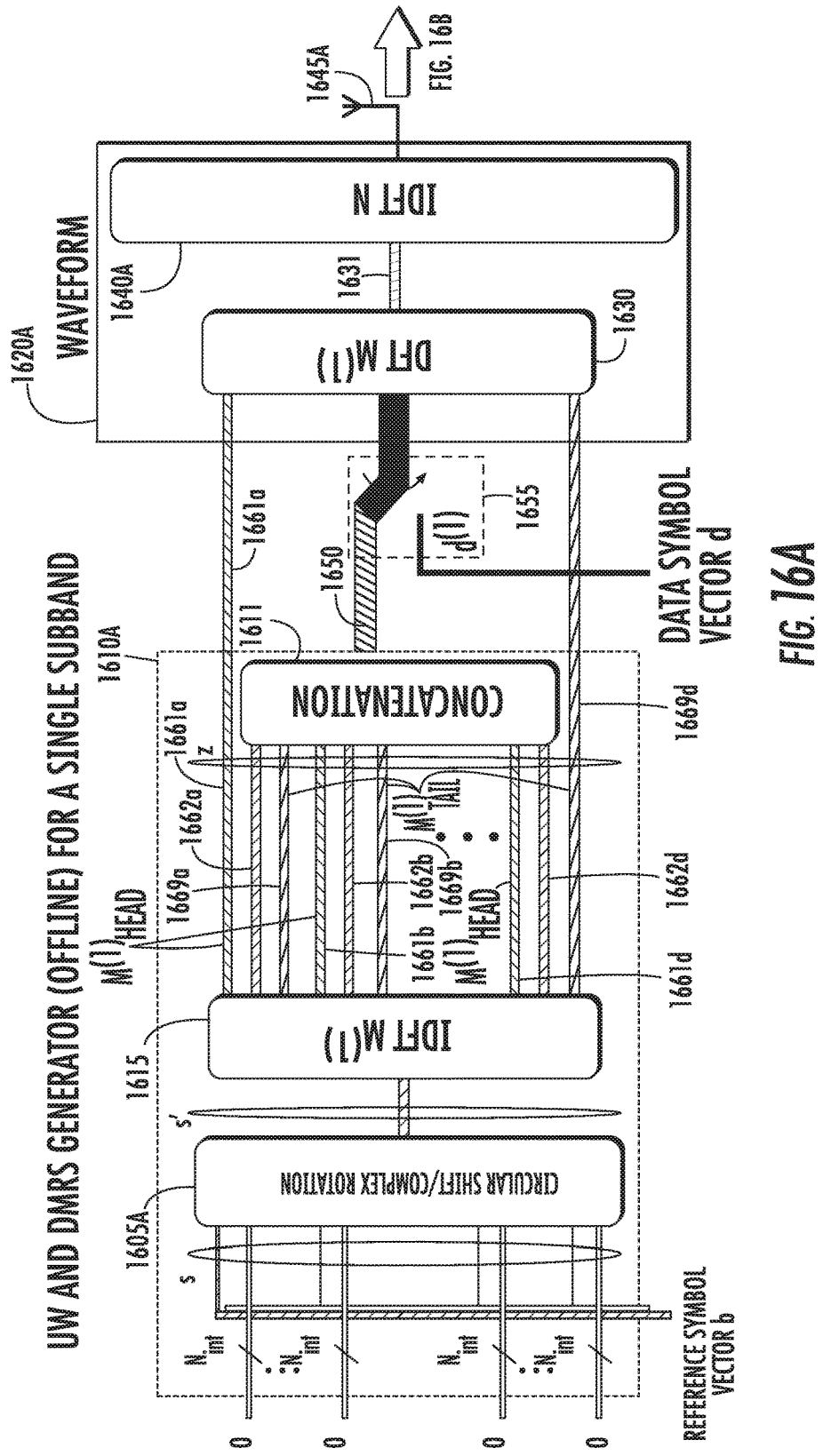
FIG. 16A is a block and signal diagram illustrating an example of a joint UW signal and demodulation reference signal (DMRS) design and the generation of a joint UW and DMRS sequence.

FIG. 16A is a block and signal diagram illustrating an example of a joint UW signal and DMRS design and the generation of a joint UW and DMRS sequence. Example steps for use in signal and block diagram 1600 are explained as follows. As shown in signal and block diagram 1600, a joint UW and DMRS sequence may be generated for use in a single subband.

An initial step may occur as follows. A UW and DMRS sequence generator 1610A, which may be offline, may generate a DMRS sequence. The UW and DMRS sequence generator 1610A may let vector $b \in \mathbb{C}^{L \times 1}$ be the text vector that contains the original sequence for DMRS in frequency. The 726 sequence may be first upsampled by a factor of $N_{int} \geq 2$. In the UW and DMRS sequence generator 1610A, the upsampled sequence may be denoted by $S=P_{upsample}b \in \mathbb{C}^{N_{int}L \times 1}$, where $P_{upsample} \in \mathbb{C}^{N_{int}L \times L}$ is the upsampling matrix. The upsampled sequence may be processed further using extra operations. The extra operations may include, for example, cyclic shift or modulation operations performed by a circular shift/complex rotation block 1605A. In order to capture this extra processing, the circular shift/complex rotation block 1605A may use a linear precoder denoted by $T \in \mathbb{C}^{N_{int}L \times N_{int}L}$ which results in a vector that includes a processed sequence given by $\acute{s}=Ts=TP_{upsample}b \in \mathbb{C}^{N_{int}L \times 1}$. To utilize the vector $\acute{s}$ as a DMRS sequence to be employed in the frequency domain, the IDFT of $\acute{s}$ may be calculated for DFT-s-OFDM by IDFT block 1615. Since the vector $\acute{s}$ is an upsampled sequence by the factor of $N_{int}$, the IDFT of $\acute{s}$ may correspond to a repeating sequence and the repetition factor may be $N_{int}+1$, by using the property that the DFT of an upsampled sequence is a repeating sequence. A DMRS sequence in frequency may be employed to generate an UW DMRS symbol in time by using an IDFT transformation which includes guard tones.

Another step may occur as follows. Here, the UW and DMRS sequence generator 1610A may generate a UW sequence based on the DMRS sequence. Specifically, in the following example, the UW and DMRS sequence generator 1610A may generate the UW sequence based on the processed upsampled DMRS sequence $\acute{s}$. After this extra processing, the vector $\acute{s}$ may be de-spread by IDFT block 1615, given by:

$$z = D^{-1}\acute{s} = D^H TP_{upsample}b \qquad \text{Equation (7)}$$

where z is a sequence that generates the desired sequence $\acute{s}$ after the spreading operation $D \in \mathbb{C}^{N_{int}L \times N_{int}L}$. The vector z may include $N_{int}+1$ repeating subsequence. The relationship between the UW sequence $u \in \mathbb{C}^{M_i \times 1}$ and DMRS sequence b may be obtained as $$U = P_{UW} H D^{-1} TP_{upsample}b, \qquad \text{Equation (8)}$$

where $P_{UW} \in \mathbb{C}^{M_i \times N_{int}L}$ is matrix which may selects the some of the elements of $\mathbb{C}$ the repeating subsequence in vector z.

Figure 16B:
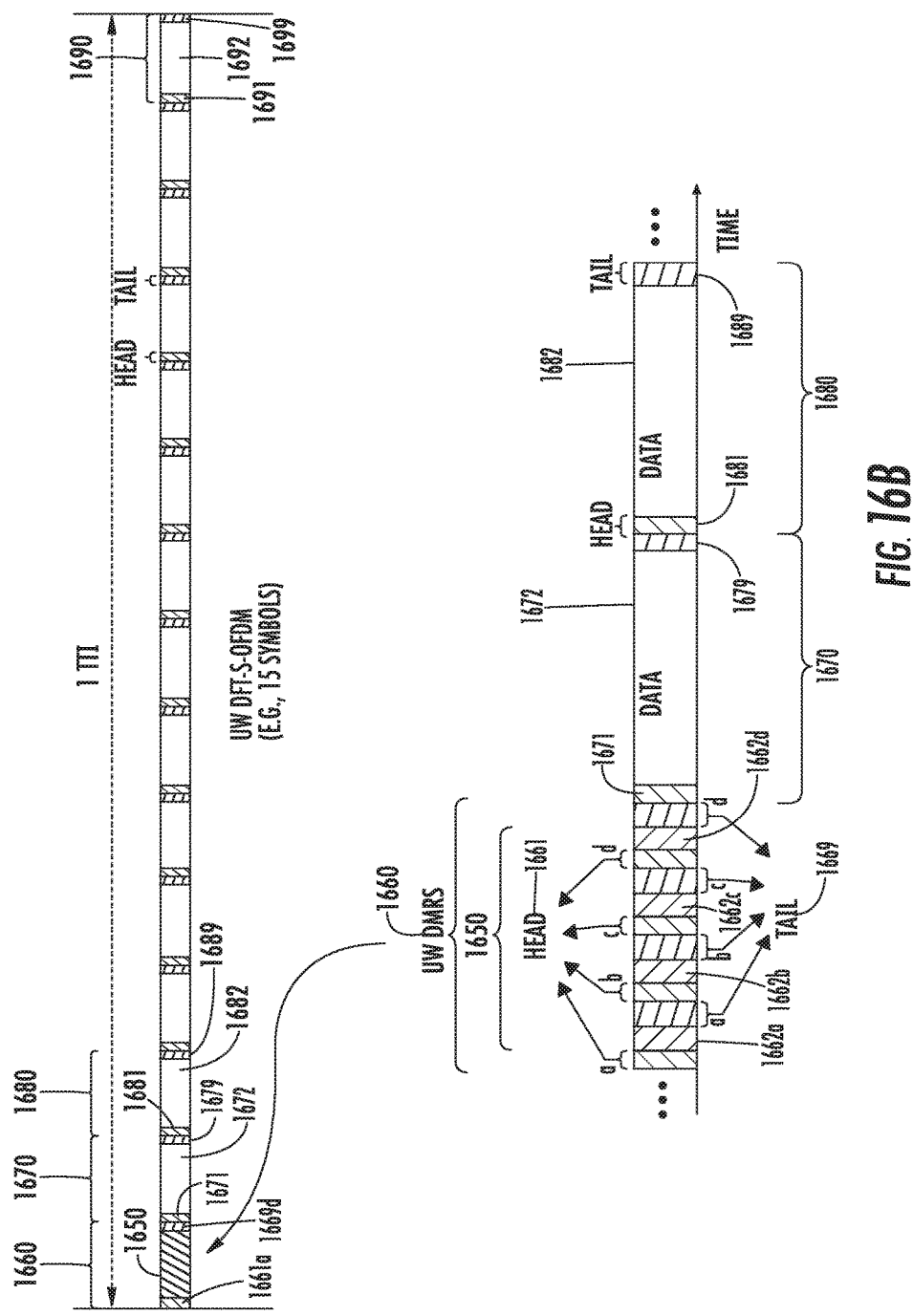
FIG. 16B is an example of a joint UW DMRS in the time domain for a single subband.

In an example shown in FIG. 16A, when switch 1655 is set to receive a DMRS sequence, IDFT block 1615 may generate head sequences 1661a, 1661b, 1661c, 1661d, reference sequences 1662a, 1662b, 1662c, 1662d, and tail sequences 1669a, 1669b, 1669c, 1669d. One of ordinary skill in the art will readily understand that head sequences 1661a, 1661b, 1661c, 1661d, reference sequences 1662a, 1662b, 1662c, 1662d, and tail sequences 1669a, 1669b, 1669c, 1669d in FIG. 16A and FIG. 16C may correspond, respectively, to head signals 1661a, 1661b, 1661c, 1661d, reference signals 1662a, 1662b, 1662c, 1662d, and tail signals 1669a, 1669b, 1669c, 1669d in FIG. 16B. Due to space requirements in FIG. 16A and clarity, sequences that correspond to signals 1661c, 1662c and 1669c shown in FIG. 16B are not shown in FIG. 16A but one of ordinary skill in the art will readily understand that such sequences may be generated in the example shown in FIG. 16A.

As shown in FIG. 16A, DFT block 1630 may receive head sequence 1661a and tail sequence 1669d. Further, concatenation block 1611 may receive the remaining sequences generated by IDFT block 1615, specifically, head sequences

1661*b*, 1661*c*, 1661*d*, reference sequences 1662*a*, 1662*b*, 1662*c*, 1662*d*, and tail sequences 1669*a*, 1669*b*, 1669*c*. Concatenation block 1611 may then concatenate the received sequences and generate at least a part of a DMRS sequence 1650 which is subsequently received by DFT block 1630 in waveform generator 1620A. DFT block 1630 may then perform pre-coding on the head sequence 1661*a*, at least a part of the DMRS sequence 1650 and tail sequence 1669*d* and spread these sequences in the frequency domain. DFT block 1630 may provide the spread sequences 1631, or data symbols, which may correspond to vector ś, to IDFT block 1640A. IDFT block 1640A may then convert the spread sequences, or data symbols, to a time domain sequence, which may be a waveform. Waveform generator 1620A may then provide the time domain sequence to transceiver 1645A for transmission. As a result, transceiver 1645A may transmit a signal with the joint UW and DMRS as shown in symbol 1660 of FIG. 16B.

In an example, a UW sequence may be formed by the concatenation of a head sequence and a tail sequence, such as head sequence 1661*a* and tail sequence 1669*d*. Further, the joint UW and DMRS may include repetition of the head sequences, reference sequence and tail sequence. Accordingly, a wireless device, such as an eNode-B or a WTRU may generate a reference sequence and then a joint UW and DMRS. Specifically, in an example, a WTRU may generate a reference sequence. Further, the WTRU may generate a DMRS sequence based on upsampling of the reference sequence. In an example, the DMRS sequence may include a plurality of repeating sequences. Further, in an example, each repeating sequence may include a head sequence, a reference sequences and a tail sequence. Also, a UW sequence within the DMRS may include one of the repeated head sequences and one of the repeated tail sequences. In addition, the WTRU may generate a DMRS signal based on a waveform operation on the DMRS sequence. The WTRU may then transmit the DMRS signal as a reference signal.

In a further example not shown in FIG. 16A, when switch 1655 is set to receive data symbol vector d, DFT block 1630 may receive data symbol vector d, a head sequence and a tail sequence. Further, DFT block 1630 may then may then perform pre-coding on the data symbol vector d, head signal and tail signal. DFT block 1630 may provide the spread sequences, or data symbols, to IDFT block 1640A. IDFT block 1640A may then convert the spread sequences, or data symbols, to a time domain sequence, which may be a waveform. Waveform generator 1620A may then provide the time domain sequence to transceiver 1645A for transmission. As a result, transceiver 1645A may transmit a signal with the head signal, data signal, and tails signal as shown in each of symbols 1670, 1680-1690 of FIG. 16B. For example, DFT block 1630 may receive a data sequence 1672, head sequence 1671 and tail sequence 1679, which may then be processed and transmitted in symbol 1670, as shown in FIG. 16B.

Accordingly, in an example, the WTRU may generate a plurality of input vectors, wherein each input vector includes a sequence of data symbols and the UW sequence. In an example, each input vector may include a data symbol vector and the UW sequence. The WTRU may then generate a plurality of DFT-s-OFDM symbols, wherein each DFT-s-OFDM symbol is based on a waveform operation on each of the input vectors. Further, the WTRU may transmit the plurality of DFT-s-OFDM symbols.

FIG. 16B is an example of a joint UW DMRS in the time domain for a single subband. The first samples and the last samples of the repeating signals may be the function of the samples of the head and tail signals, respectively, as illustrated in FIG. 16B. For example, head signals 1661*a*, 1661*b*, 1661*c*, 1661*d*, 1671, 1681-1691 may be repeating signals. One of ordinary skill in the art will understand that each of the symbols shown in FIG. 16B will have a head signal and a tail signal that repeat. As a result, 1661*a*, 1661*b*, 1661*c*, 1661*d*, 1671, 1681-1691 may be the same signal repeated multiple times. Further, tail signals 1669*a*, 1669*b*, 1669*c*, 1669, 1679, 1689-1699 may be repeating signals. As a result, 1669*a*, 1669*b*, 1669*c*, 1669, 1679, 1689-1699 may be the same signals repeated multiple times. The UW sequence, i.e., u, which is generated based on the vector b, may be used with the other data symbols, such as data symbol vector d, in a TTI and the multiple instances of UW DMRS symbol 1660, for example, IDFT of s, may be located in anywhere in the TTI. In examples not shown in FIG. 16B, the UW DMRS symbol 1660 may be located in the last symbol of the TTI, such as symbols 1690, or in a middle symbol of the TTI, such as symbols 1670 or 1680. As shown in FIG. 16B, at least a part of the DMRS sequence 1650 may be located at the first symbol, UW DMRS 1660, as it enhances the demodulation performance of the first symbol 1660. Head signals 1671, 1681-1691 and tail signals 1679, 1689-1699 may be multiplexed with data signals 1672, 1682-1692 to form signals 1660, 1670, 1680-1690, as shown.

Such approaches to joint construction of DMRS and UW may provide several benefits. For example, if the relationship between u and b, provided in Equation (8), is satisfied, the tail signal of the first data symbol in time may be same as the tail signal of the UW DMRS symbol. Hence, the first data symbol maintains the circular convolution of the channel.

In this solution, the DMRS sequence is upsampled by a factor of $N_{int} > 2$. Therefore, the symbol has a repetitive structure by a factor of $N_{int}$ in the time domain. Therefore, the DMRS symbol can maintain the circular convolution by itself without CP using a simple replacement operation in the time domain. For instance, let $N_{int}$ be 4. Then, the symbol would have a repetitive structure by a factor of 4 and the repeating structure will include the head and tail signals as shown in FIGS. 16A, 16B, 16C, 17 and 18.

For example, as shown in FIG. 16A and FIG. 16B, a repetitive UW DMRS structure 1660 may be composed of 4 repetitions of a head signal, such as, specifically, 1661*a*, 1661*b*, 1661*c*, 1661*d*, 4 repetitions of a reference signal, such as, 1662*a*, 1662*b*, 1662*c*, 1662*d*, and 4 repetitions of a tail signal, such as 1669*a*, 1669*b*, 1669*c*, 1669*d*. The head signal may then be used in each symbol as a repeated header, and the tail signal may likewise be used as a repeated tail signal. For example, symbol 1670 may include header signal 1671, data signal 1672 and tail signal 1679. As a further example, symbol 1680 may include header signal 1681, data signal 1682 and tail signal 1689. In this way, head signal 1661 and tail signal 1669 are used in a repetitive manner within UW DMRS 1660 as well as in each of the 15 symbols in a TTI.

Figure 16C:
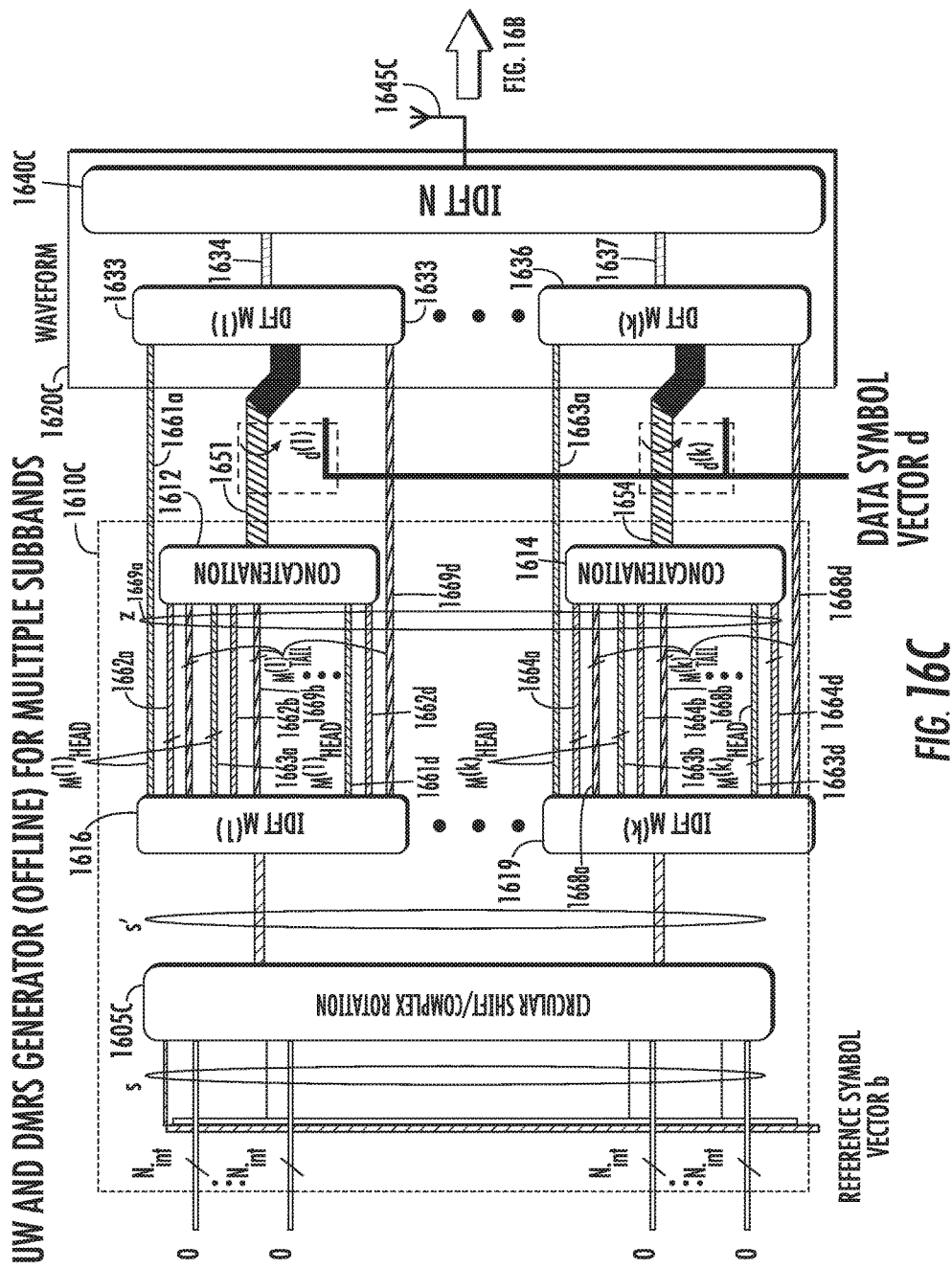
FIG. 16C is a block and signal diagram illustrating an example of a joint UW and DMRS design and the generation of a joint UW and DMRS for use in multiple subbands.

FIG. 16C is a block and signal diagram illustrating an example of a joint UW and DMRS design and the generation of a joint UW and DMRS for use in multiple subbands. In an example shown in FIG. 16C, a UW and DMRS generator for multiple subbands 1610C, which may be offline, may generate a DMRS sequence. The UW and DMRS generator 1610C may let vector $b \in \mathbb{C}^{L \times 1}$ be the vector that contains the original sequence for DMRS in frequency, in manner similar to that of UW and DMRS generator 1610A in FIG. 16A. Further, the circular shift/complex rotation block 1605C may use a linear precoder to produce vector ś, in a manner similar to that of the circular shift/complex rotation block 1605A in FIG. 16A.

As shown in an example in FIG. 16C, for multiple subbands, an operation which includes a group of IDFT operations performed by IDFT blocks, such as IDFT blocks 1616-1619, may also be applied to vector ś to generate the desired DMRS sequence in frequency. In an example, a DMRS sequence in frequency may be employed to generate UW DMRS symbol in time by using an IDFT transformation which includes the guard tones.

Further, the UW and DMRS generator 1610C may generate the UW by including processing by a group of IDFT operations on the upsampled DMRS sequence s. After this extra processing, the vector ś may be de-spread by IDFT blocks 1616-1619, in a manner similar to that of IDFT block 1615 of FIG. 16A and Equation (7). As a result, IDFT blocks 1616-1619 may generate vector z, where vector z is a sequence that generates the desired sequence ś after the spreading operation D. Without loss of generality, $D^{-1}$ may be a block diagonal matrix which include multiple IDFT spread blocks, such as IDFT blocks 1616-1619, where the size of ith IDFT is denoted by $M^{(i)}$, which leads to $N_{int}L=\Sigma_i M^{(i)}$. The relationship between the UW sequence $u \in \mathbb{C}^{M_i \times 1}$ and DMRS sequence b may be obtained by Equation (8) in a manner similar to that shown regarding FIG. 16A. As a result, vector z may include a repeating sequence.

In an example shown in FIG. 16C, when a switch is set to receive a part of the DMRS sequence, IDFT block 1616 may generate head sequences 1661a, 1661b, 1661c, 1661d, reference sequences 1662a, 1662b, 1662c, 1662d, and tail sequences 1669a, 1669b, 1669c, 1669d. As shown in FIG. 16C, DFT block 1633 may receive head sequence 1661a and tail sequence 1669d. Due to space requirements in FIG. 16C and clarity, sequences that correspond to signals 1661c, 1662c and 1669c in FIG. 16B are not shown in FIG. 16C but one of ordinary skill in the art will readily understand that such sequences may be generated in the example shown in FIG. 16C.

Further, concatenation block 1612 may receive the remaining sequences generated by IDFT block 1616, specifically, head sequences 1661b, 1661c, 1661d, reference sequences 1662a, 1662b, 1662c, 1662d, and tail sequences 1669a, 1669b, 1669c. Concatenation block 1612 may then concatenate the received sequences and generate at least a part of a DMRS sequence 1651 which is subsequently received by DFT block 1633 in waveform generator 1620C. DFT block 1633 may then perform pre-coding on the head signal 1661a, at least a part of the DMRS sequence 1651 and tail sequence 1669d, and spread these sequences in the frequency domain. DFT block 1633 may provide the spread sequences 1634, or data symbols, to IDFT block 1640C. IDFT block 1640C may then convert the spread sequences, or data symbols, to a time domain sequence, which may be a waveform. Waveform generator 1620C may then provide the time domain sequence to transceiver 1645C for transmission. As a result, transceiver 1645C may transmit a signal in a first subband with the joint UW and DMRS as shown in symbol 1660 of FIG. 16B, which shows the signal in the time domain.

In a further example not shown in FIG. 16C, when a switch is set to receive data symbol vector d, DFT block 1633 may receive data symbol vector d, a head sequence and tail sequence. In this example, DFT block 1633 may then perform pre-coding on the data symbol vector d, head sequence and tail sequence. DFT block 1633 may provide the spread sequences, or data symbols, to IDFT block 1640C. IDFT block 1640C may then convert the spread sequences, or data symbols, to a time domain sequence, which may be a waveform. Waveform generator 1620C may then provide the time domain sequence to transceiver 1645C for transmission. As a result, transceiver 1645C may transmit a signal in a first subband with the head signal, data signal and tails signal as shown in each of symbols 1670, 1680-1690 of FIG. 16B.

In a similar manner, further joint UW and DMRS signals and data signals may be generated and transmitted on additional subbands. In an example further illustrating the use of multiple subbands and specifically showing the generation and transmission of the final subband in FIG. 16C, a switch may be set to receive at least a part of a DMRS sequence 1654. IDFT block 1619 may generate head sequences 1663a, 1663b, 1663c, 1663d, reference sequences 1664a, 1664b, 1664c, 1664d, and tail sequences 1668a, 1668b, 1668c, 1668d. As shown in FIG. 16C, DFT block 1636 may receive head sequence 1663a and tail sequence 1668d. Due to space requirements in FIG. 16C and clarity, sequences 1663c, 1664c and 1668c are not shown but one of ordinary skill in the art will readily understand that such sequences may be generated in the example shown.

Further, concatenation block 1614 may receive the remaining sequences generated by IDFT block 1619, specifically, head sequences 1663b, 1663c, 1663d, reference sequences 1664a, 1664b, 1664c, 1664d, and tail sequences 1668a, 1668b, 1668c. Concatenation block 1612 may then concatenate the received sequences and generate at least a part of the DMRS sequence 1654 which is subsequently received by DFT block 1636 in waveform generator 1620C. DFT block 1636 may then perform pre-coding on the head signal 1663a, at least a part of the DMRS sequence 1654 and tail sequence 1668d and spread these sequences in the frequency domain. DFT block 1636 may provide the spread sequences 1637, or data symbols, to IDFT block 1640C. IDFT block 1640C may then convert the spread sequences, or data symbols, to a time domain sequence, which may be a waveform. Waveform generator 1620C may then provide the time domain sequence to transceiver 1645C for transmission. As a result, transceiver 1645C may transmit a signal in a final subband with the joint UW and DMRS.

In a further example not shown in FIG. 16C, when a switch is set to receive data symbol vector d, DFT block 1636 may receive data symbol vector d, a head sequence and tail sequence. At the conclusion of processing similar to processing described herein above, transceiver 1645C may transmit a signal in a final subband with the head signal, data signal and tails signal. As one of ordinary skill in the art will readily understand, additional similar processing may be performed for subbands between the first subband and the final subband but are not shown due to space limitations. The transmission of the joint UW and DMRS symbols and data symbols may be like that shown in FIG. 16B for each of the subbands. Specifically, FIG. 16B may be considered to show an example of a transmission in the time domain of a single subband.

FIG. 17 is a block and signal diagram illustrating another example of joint DMRS and UW. Block and signal diagram 1700 show similar examples as those in block and signal diagram 1600 but illustrates different aspects of the processing. For example, an original DMRS b vector may be received by an upsample sequence block 1702, in a UW and DMRS generator 1710, for upsampling using an upsampling factor $N_{int}$. The upsampled sequence may be processed further using extra operations. The extra operations may include, for example, cyclic shift or modulation operations performed by a circular shift/complex rotation processing block 1705. In order to capture this extra processing, the circular shift/complex rotation processing block 1705 may use a linear precoder T. The IDFT transformation may be applied by IDFT block 1715, which may use a size-M IDFT, where M=L×N$_{int}$. Selection block 1718 may then select a UW head, UW tail and/or a part of a DM-RS sequence from the results of IDFT block 1715.

The resulting selections from selection block 1718 may be mapped, along with data symbols, to a DFT block 1730 of size M, in a waveform generator 1720. The results of DFT block 1730 may be mapped to subcarriers by sub-carrier mapping block 1735. The output of sub-carrier mapping block 1735 may undergo IFFT processing by IFFT processing block 1740 of size N. The results of IFFT processing block 1740 may be then sent to a transmitter for transmission.

In a similar fashion to the example shown in FIG. 16A and FIG. 16C, in the example in FIG. 17, the transmission shown includes a repetitive UW DMRS structure. The transmission in the time domain is shown in FIG. 16B.

Figure 18:
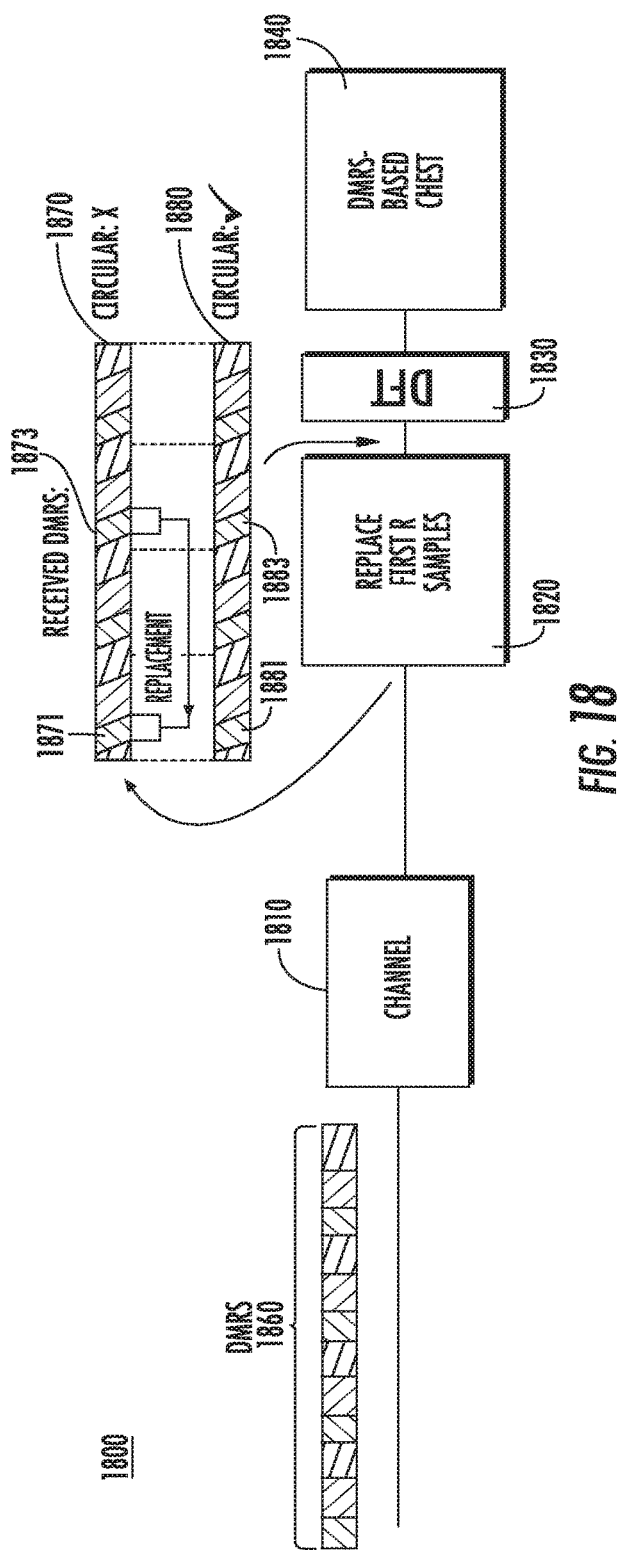
FIG. 18 is block diagram illustrating an example of replacing the first R samples for circular convolution.

FIG. 18 is block diagram illustrating an example of replacing the first R samples for circular convolution. In an example shown in block diagram 1800, after DMRS symbol 1860 passes through channel 1810, the received symbol cannot be expressed as a circular convolution operation as the proposed DMRS symbol does not utilize CP extensions. On the other hand, as the DMRS symbol has a repetitive structure, the first R samples of the received DMRS symbol can be replaced with the corresponding samples, which could allow an expression with circular convolution of the channel after the replacement operation as exemplified in FIG. 18. For example, a replacement block 1820 may replace the first R samples of received DMRS symbol with another R samples appearing later in 1870. In an example, head signal 1873 of DMRS symbol 1870 may replace head signal 1871, resulting in head signal 1881 of DMRS symbol 1880. In this way, head signal 1883 of DMRS symbol 1880 may be the same as head signal 1881. As a result, DMRS symbol 1880 may be circular even though the received DMRS symbol 1870 was not.

Further, the resultant DMRS symbol 1880 may be mapped to DFT block 1830 and then DMRS-based channel estimation (CHEST) may be applied to the output of DFT block 1830 in a DMRS-based CHEST block 1840.

Examples of various signaling aspects are discussed further herein. For example, the relationship between UW and DMRS can be calculated online or offline, e.g., a map or table which contains both UW and DMRS can be generated offline. Then, the index or indices of this table can be signaled.

The joint UW and DMRS can be used for implicit signaling such as providing acknowledgement (ACK)/negative acknowledgement (NACK) operations. The preamble or DMRS signal can be located anywhere in the TTI or it may be omitted. For example, if the WTRU does not change its RBs, the preamble may be omitted in the following TTI(s) to increase spectral efficiency. In this case, the existence of DMRS may need to be signaled.

If there is frequency and/or channel hopping within a TTI, the proposed DMRS and UW can be calculated based on Equation (8) and joint DMRS and UW can be transmitted at the beginning of each slot.

By increasing the interleaving factor, i.e., N$_{int}$, more robust channel estimation may be achieved as this operation can increase the energy on the non-zero subcarriers for the DMRS.

Examples of channel estimation aspects are further discussed herein, including some examples for DMRS based channel estimation for UW-based waveforms.

Figure 19:
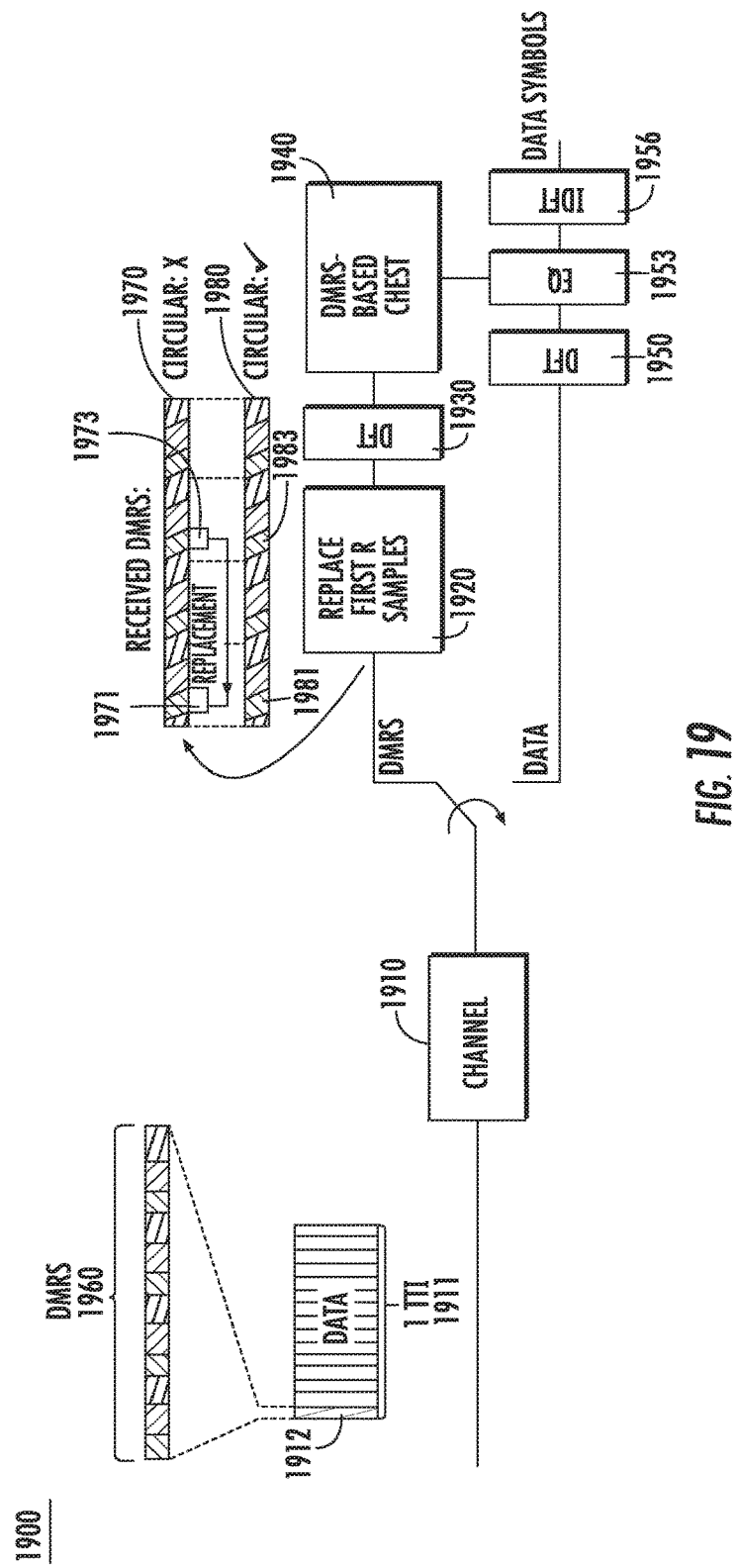
FIG. 19 is a block diagram illustrating an example of DMRS-based channel estimation.

FIG. 19 is a block diagram illustrating an example of DMRS-based channel estimation. As shown in an example in block diagram 1900, processing similar to that in FIG. 18 is performed but in FIG. 19 both data and the DMRS may be sent. For example, DMRS symbol 1960 may be transmitted as symbol 1912 in the 15 symbol TTI 1911. In an example, 15 symbols may be sent in a TTI of 1 ms. The other 14 symbols of TTI 1911 may be data symbols. After TTI 1911 passes through channel 1910, further processing may be determined on a per symbols basis, based on whether the symbol is the DMRS or a data symbol. As in FIG. 18, the received DMRS symbol cannot be expressed as a circular convolution operation as the proposed DMRS symbol does not utilize CP extensions. Therefore, similar to the processing in FIG. 18, a replacement block 1920 may replace the first R samples of received DMRS symbol with another R samples appearing later in 1970. In an example, head signal 1973 of DMRS symbol 1970 may replace head signal 1971, resulting in head signal 1981 of DMRS symbol 1980. In this way, head signal 1983 of DMRS symbol 1980 may be the same as head signal 1981. As a result, DMRS symbol 1980 may be circular even though the received DMRS symbol 1970 was not.

If a data symbol is received, it may be processed by a DFT-s-OFDM receiver. The DFT-s-OFDM receiver may include DFT block 1950, equalizer block 1953 and IDFT block 1956. Further, the resultant DMRS symbol 1980 may be mapped to DFT block 1930 and then DMRS-based CHEST may be applied to the output of DFT block 1930 in a DMRS-based CHEST block 1940. For DMRS-based channel estimation, the values on the subcarriers corresponding to the non-zero samples of DMRS may be expressed in terms of frequency, i.e., x as $$x = A\theta + n, \qquad \text{Equation (9)}$$

where $A \triangleq \text{diag}\{b\}$ and $\theta \in \mathbb{C}^{M_{nz} \times 1}$ is the channel frequency response for the subcarriers that may be modulated by the non-zero DMRSs. In this case, a general form of linear estimator can be expressed as $$\tilde{\theta} = (A^H A + R) A^H x \qquad \text{Equation (10)}$$

where $R \in \mathbb{C}^{M \times N}$ is the regularization matrix. Different estimators can be $\mathbb{C}$ developed as follows.

In an example, a linear minimum mean square error (LMMSE) estimator may be used. Specifically, for example, if $R = \sigma_n^2 C_\theta$ where $\sigma_n^2$ is the noise and $C_\theta$ is the covariance matrix of $\theta$, the estimator may obtain LMMSE. In this case, the estimator may require the second-order statistics of $\theta$, which may include, for example, a power delay profile. However, second-order characteristics may vary and thus regular re-estimation may be required.

In a further example, a mismatched MMSE estimator may be used. For example, in order to avoid estimation of the second order characteristics of the channel, it may be assumed that the PDP is L-tap uniform and each tap is independent from each other. In that case, $$C_\theta = E[\theta \theta^H] = NE[F_p h h^H F_p^H] = \frac{N}{L} F_p F_p^H \text{ where}$$

$$F_p \in \mathbb{C}^{M_{nz} \times L}$$

is the matrix that selects the rows corresponding to the non-zero symbol positions of the DMRS and the first L columns of the normalized DFT matrix, and $h \in \mathbb{C}^{L \times 1}$ is channel impulse response with uniform power delay profile.

In yet a further example, a regularized estimator may be used. Specifically, for example, if $R=\alpha I_K$ where $\alpha$ is a scalar and $I_K$ is the K×K identity matrix, the estimator may correspond to regularized LS. This estimator may address an ill-conditioned least squares estimator, but it may not count the correlation between the elements of $\theta$.

After the variable $\theta$ is estimated, the estimated channel response on the position of non-zero subcarriers may be interpolated. One approach is to use a DFT structure, such as in DMRS-based CHEST block 1940, for a smoothing matrix. Using this approach, the estimated channel frequency response can be expressed as $$\hat{h}_f = F_L F_p^\dagger \hat{\theta} \qquad \text{Equation (11)}$$

where $\hat{h}_{frequency} \in \mathbb{C}^{M \times 1}$ is the estimated channel frequency response. $F_L \in \mathbb{C}^{M \times L}$ is the matrix that selects the rows corresponding to the symbol positions in the RBs and the first L columns of the DFT matrix.

Examples of DMRS-based Channel Tracking are discussed further herein. Assuming that channel impulse response is a time-varying smooth function, the time-correlation between the channels at previous and current symbols may be exploited in order to enhance the channel estimation performance. Many approaches are possible, such as least mean squares (LMS), recursive least squares (RLS), and/or Kalman-based filters, which do not require any prior statistical knowledge of the channel characteristics and may eliminate the matrix inversions. Such adaptive algorithms may be used to "learn" the channel characteristics and permit channel tracking as the new channel estimate is obtained by using the learned channel characteristics and previous channel estimate. In the examples that follow, a Kalman filter is used for convenience. However, other filters may be used without loss of functionality.

Figure 20:
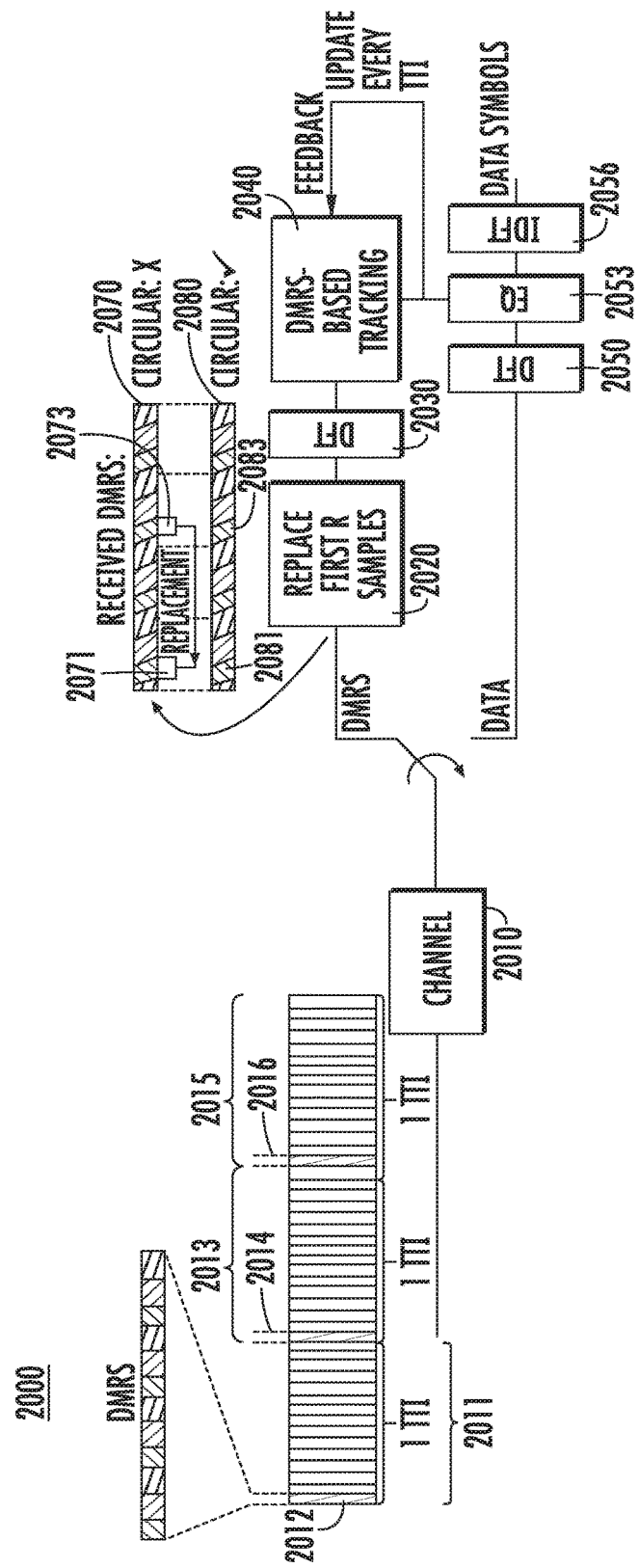
FIG. 20 is a block diagram illustrating an example of DMRS-based channel tracking.

FIG. 20 is a block diagram illustrating an example of DMRS-based channel tracking. As shown in an example in block diagram 2000, processing similar to that in FIG. 18 and FIG. 19 is performed but in FIG. 20, multiple DMRS symbols may be sent and, therefore, the channel may be better estimated. For example, a DMRS symbol may be transmitted as symbol 2012 in the 15 symbol TTI 2011. Also, DMRS symbol 2014 may be transmitted in TTI 2013 and DMRS symbol 2016 may be transmitted in TTI 2015. In an example, 15 symbols may be sent in a TTI of 1 ms. The other 14 symbols of TTIs 2011, 2013, 2015 may be data symbols. After a TTI, such as TTI 2011, passes through channel 2010, further processing may be determined on a per symbols basis, based on whether the symbol is the DMRS or a data symbol. As in FIG. 18 and FIG. 19, the received DMRS symbol cannot be expressed as a circular convolution operation as the proposed DMRS symbol does not utilize CP extensions. Therefore, similar to the processing in FIG. 18 and FIG. 19, a replacement block 2020 may replace the first R samples of received DMRS symbol with another R samples appearing later in 2070. In an example, head signal 2073 of DMRS symbol 2070 may replace head signal 2071, resulting in head signal 2081 of DMRS symbol 2080. In this way, head signal 2083 of DMRS symbol 2080 may be the same as head signal 2081. As a result, DMRS symbol 2080 may be circular even though the received DMRS symbol 2070 was not.

If a data symbol is received, it may be processed by a DFT-s-OFDM receiver. The DFT-s-OFDM receiver may include DFT block 2050, equalizer block 2053 and IDFT block 2056. Further, the resultant DMRS symbol 2080 may be mapped to DFT block 2030 and then DMRS-based CHEST may be applied to the output of DFT block 2030 in a DMRS-based CHEST block 2040. In addition, in FIG. 20, feedback may be determined in every TTI and fed back into DMRS-based CHEST block 2040 to better estimate the channel.

Assume that channel frequency response changes based on the linear model given by:

$$\theta^{(n)} = \theta^{(n-1)} + u^{(n)} \qquad \text{Equation (12)}$$

where $u^{(n)} \sim \mathcal{N}(0, Q)$ and n is the TTI index. Next, a new observation may be made which may imply that a new DMRS symbol may be transmitted back to back or in different TTIs. This approach may be expressed by the following:

$$x^{(n)} = A^{(n)} \theta + n \qquad \text{Equation (13)}$$

Then, the steps for the Kalman filter can be expressed as:
Step 1: Minimum prediction MSE matrix:

$$M^{(n|n-1)} = M^{(n-1|n-1)} + Q \qquad \text{Equation (14)}$$

Step 2: Kalman gain vector:

$$K^{(n)} \triangleq M^{(n|n-1)} A^{(n)H} (A^{(n)} M^{(n|n-1)} A^{(n)H} + C^{(n)})^{-1} \qquad \text{Equation (15)}$$

Step 3: Minimum MSE matrix $$M^{(n|n)} \triangleq (I - K^{(n)} A^{(n)}) M^{(n|n-1)} \qquad \text{Equation (16)}$$

Step 4: Channel estimation update $$\hat{\theta}^{(n|n)} = \hat{\theta}^{(n-1|n-1)} + K^{(n)} (x^{(n)} - A^{(n)} \hat{\theta}^{(n|n-1)}) \qquad \text{Equation (17)}$$

Examples of enabling asynchronous access using the UW are further discussed herein. Specifically, both asynchronous and grant-free transmission may be necessary in future communication systems. Grant-free transmission may be necessary for nodes that have to commence transmission of low latency traffic without waiting for a resource allocation. It may also be used by machines to reduce signaling overhead. Asynchronous transmission may be necessary for nodes that cannot stay synchronized at all times, for example, due to limited power. The UW may be facilitated in such cases to enable asynchronous and grant-free transmission.

Since the UW is part of the DFT-s-OFDM symbol, its size may be changed by the WTRU without changing the DFT-s-OFDM symbol duration. Different WTRUs may use UWs of different lengths, as long as the UW length is larger than or equal to the channel delay spread.

Figure 21:
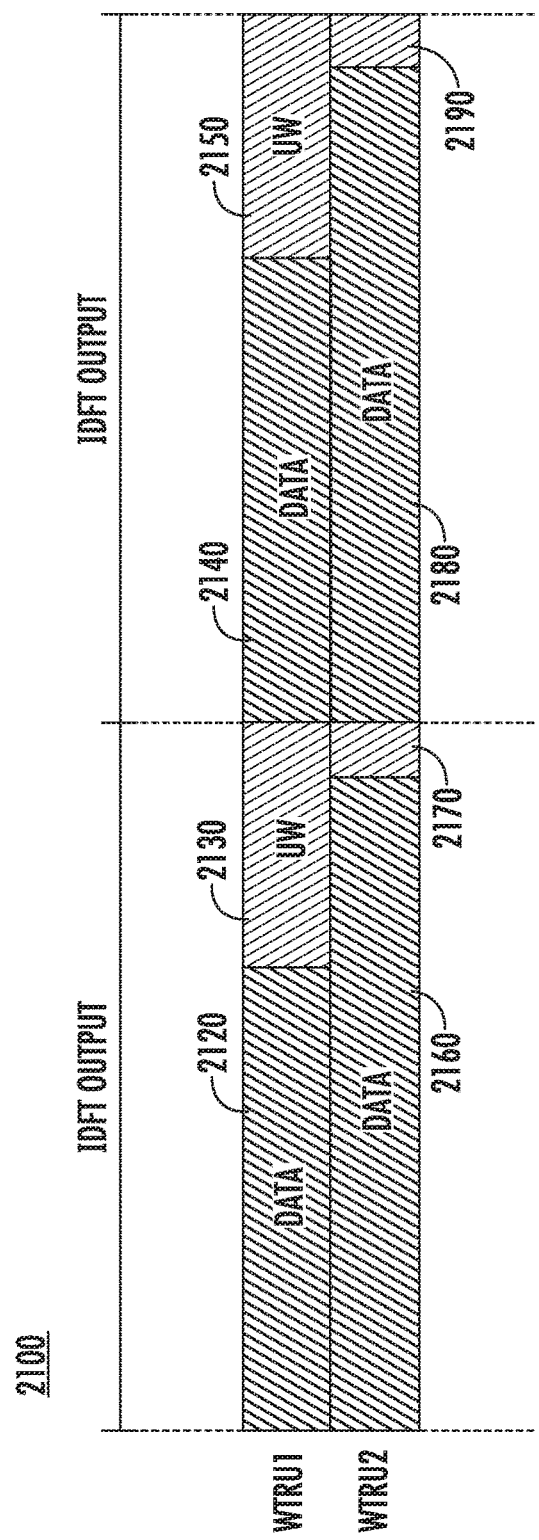
FIG. 21 is a signal diagram illustrating example WTRU specific UW length configurations.

FIG. 21 is a signal diagram illustrating example WTRU specific UW length configurations. As shown in an example in signal diagram 2100, the length of the UW and the sequence to be used as the UW may be configured by the base station semi-statically, or indicated in the control channel. For example, WTRU1 may use UW 2130 after data part 2120 and UW 2150 after data part 2140. Further, WTRU2 may use UW 2170 after data part 2160 and UW 2190 after data part 2180. UWs 2130, 2150 may be longer than UWs 2170, 2190. However, all of the UWs shown in FIG. 21, specifically UWs 2130, 2150, 2170, 2190, may be larger than or equal to the channel delay spread.

An example solution to converge to the correct UW length is further discussed herein. In this example, a WTRU that does not have correct timing synchronization starts transmission with the largest UW length possible. A set of possible lengths for the UW and the corresponding sequences may have been configured by a controller and this information may have been stored by the WTRU. If the receiver is the central controller, or has the necessary information, it may blindly detect the UW transmitted and establish timing. If the UW length is larger than required, by using control signaling that may be included in a grant, it may inform the WTRU to start using another UW.

In another example, a sufficiently long UW may be used to compensate for the channel delay spread and timing offset. The UW index may be assigned to the WTRU at the time of first connection to the network.

Examples of grant-free transmission are further discussed herein. In certain cases, it may be desirable for a WTRU to transmit its data as soon as possible, without waiting to go through a random access procedure, or without waiting for a grant. In such a scenario, a UW may be used to compensate for the timing offset and also act as a WTRU identifier.

Figure 22:
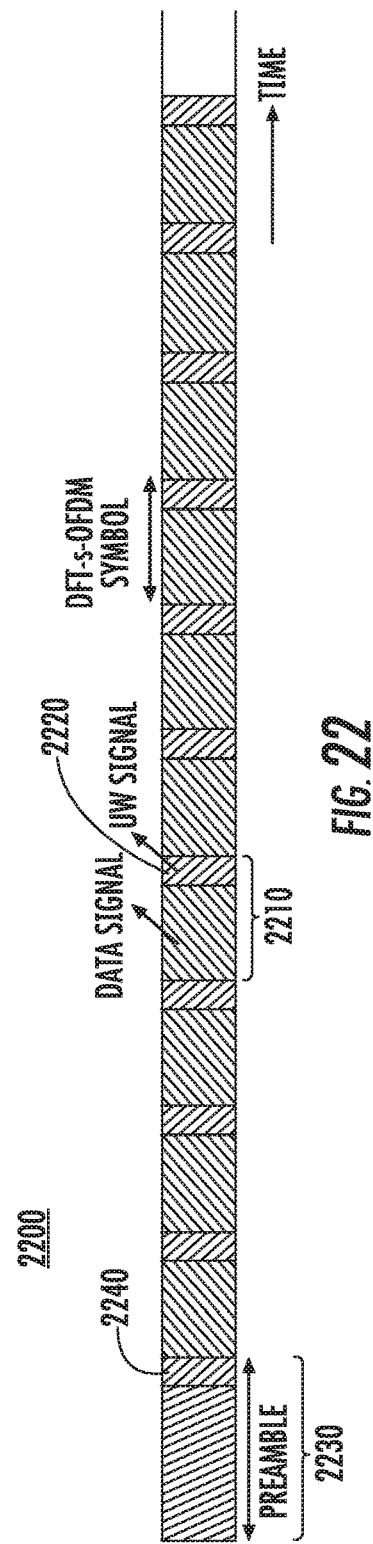
FIG. 22 is a signal diagram illustrating an example UW preamble transmission.

FIG. 22 is a signal diagram illustrating an example UW preamble transmission. In one example method shown in signal diagram 2200, a long UW may be used in addition to the regular UWs within the DFT-s-OFDM symbols. For example, a regular UW 2220 may be transmitted in DFT-s-OFDM symbol 2210. In addition, preamble 2230 with UW 2240 may be transmitted. The preamble 2230 may serve as a long UW and used in addition to UWs 2220, 2240. The preamble 2230 transmitted at the beginning may be linked to the WTRU ID or another identifier. One or more of the UWs may also be linked to a WTRU identifier.

The preamble 2230 and UW sequences 2220, 2240 may be assigned to the WTRU when it accesses the network (for the first time or at specific times), and may be stored in the device's memory. Signals transmitted without establishing a connection may be transmitted on reserved time and frequency resources.

In another example method, the preamble may be just the UW signal. In this case, the receiver may identify the WTRU from the UW sequence, and may establish timing by using the UWs within the DFT-s-OFDM symbols.

In further examples, many machine type devices may need to share the same channel. Thus, data may need to be transmitted such that received signal-to-noise ratio is sufficiently high for correct decoding of the data. One possible way to achieve this condition is to use spreading. Data symbols that are fed into the DFT block may be spread with a WTRU-specific spreading sequence.

Figure 23:
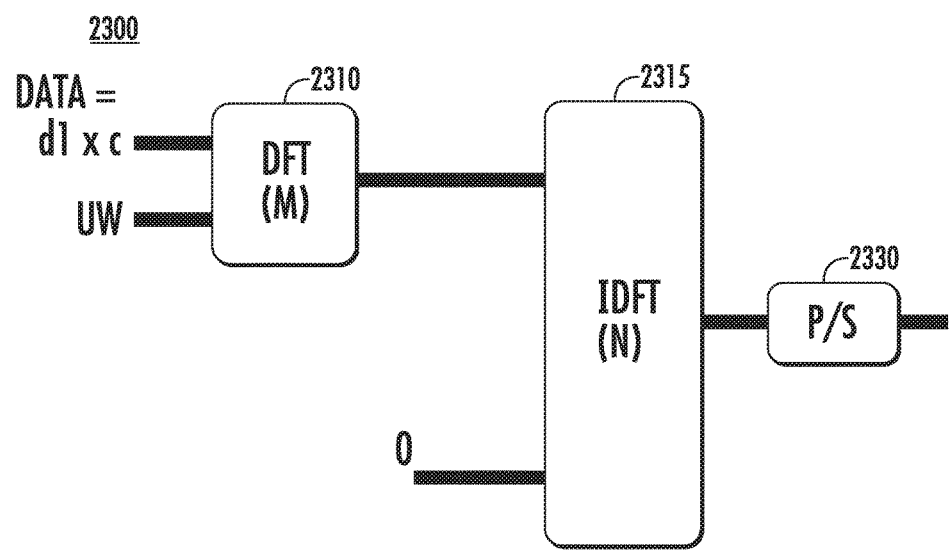
FIG. 23 is a block diagram illustrating an example of data spreading for robust transmission using a UW DFT-s-OFDM.

FIG. 23 is a block diagram illustrating an example of data spreading for robust transmission using a UW DFT-s-OFDM. As an example shown in block diagram 2300, assume that the size of the DFT block 2310 is M. One BPSK or one QPSK symbol, d1, may be multiplied with a spreading sequence c of length pM and fed into the first pM inputs of the DFT block 2310, as illustrated in FIG. 23, where $0<p<1$. As a result, DFT block 2310 may use one data symbol which may be scalar and which may scale sequence c. The UW sequence may then be mapped to the last (M−pM) inputs of the DFT block 2310. A different data symbol may be transmitted in each DFT-s-OFDM block. The UW sequence and the spreading sequences may be configured by the base station semi-statically. It also may be possible to spread more data symbols by using different spreading sequences and adding them before feeding into the DFT block 2310. Shorter spreading sequences may also be used to spread data symbol before being fed into different inputs of the DFT block 2310. IDFT block 2315 may be an IDFT size N. Further, IDFT block 2315 may provide its output to P/S block 2330 which may output the signal.

Timing synchronization may gradually be lost, for example due to timing drift. In grant-free transmission, since the base station may not send grants (grants may also include timing correction commands), the loss in synchronization may not be recovered. One solution to recover the timing synchronization information may be to store timing advance information from the previous commands, and use the stored timing information for the first transmission opportunity.

In another method, the WTRU may listen to transmissions of other WTRUs and autonomously determine the timing advance information. In order to enable this functionality, the UW signal may be modified when the WTRU is in-synch with network. For example, the UW's sign or the UW sequence itself may be modified. This may be beneficial to other WTRUs which are the out-of-synch with the network, to adjust their timing advance blindly.

In another method, the WTRU may start transmission with a long UW, and then gradually reduce the duration of the UW based on the received feedback. For example, based on the ACK/NACK feedback, if the success rate of transmissions is above a high-threshold, it may start reducing the length of the UW in the following transmissions. The next UW may be selected in a pre-defined way from a list of UW, such that the receiver may use blind detection to determine which UW was used. The information needed at the receiver to decode the grant-free transmission, such as the transport block size, modulation type, coding rate, may be signaled by the transmitter as control information.

In yet another method, measurements based on the uplink data and/or reference signal transmissions may be used by the network to estimate uplink receive timing. Based on these measurements the network may determine whether the size and/or index of the UW sequence needs to be modified. This may then be explicitly signaled to the WTRU.

The signaling of timing advance related UW updates may be relatively infrequent and may depend on the type of WTRU under consideration. As an example, for low power, low complexity WTRUs/devices such as those involved in massive Machine type communications (mMTC), reducing complexity and minimum power consumption are of primary importance. In such scenarios a coarser level of granularity for the choice of the UW sequence used to compensate for the timing offset may suffice, and hence there may be no need for the network to explicitly signal an UW update.

On the other hand WTRUs/devices involved in ultra-reliable or critical MTC (cMTC) communications may benefit from a finer level of tuning for the UW. For these devices the network may reconfigure (based on measurements as mentioned above) the UW sequence size/and or index dynamically through L1/L2 control signaling. The network may identify the WTRU type based on the UW sequence utilized by the WTRU (since the UW may be used as a WTRU identifier as mentioned earlier).

Examples of transmission of control information with a UW, UW signaling of control information, and signaling procedures for the same, are further discussed herein. Specifically, the UW may also be used to carry certain control and system information. To enable this, a set of sequences may be determined for each combination of possible data, and the sequence corresponding to specific data may be transmitted. As an example, 4 different UW sequences may be used to carry 2 bits of control or system information.

One control information that may be carried by the UW is acknowledgment signaling, for example, ACK/NACK information. In an example, two UWs may be reserved: one for the ACK and one for the NACK. If the WTRU needs to transmit an ACK, then the corresponding sequence may be selected for transmission. This sequence may be transmitted over multiple DFT-s-OFDM symbols to improve reliability.

The two UW sequences may be different sequences or may for example be generated from the same sequence by modulating the sequence by +b and −b (for example, b=1). To transmit more control bits, a larger number of UW sequences may be used. For example, 2-bit control information may be sent by choosing one of 4 possible sequences. Alternatively, a UW may consist of two separate UW sequences (UW=[uw1 uw2] and 4 possibilities may be created by modulating uw1 and uw2 by b and −b, i.e., the four possibilities are: =[buw1 buw2]; =[buw1−buw2]; =[−buw1 buw2]; and =[−buw1−buw2]. UW may also be used to transmit scheduling request.

If the length of the UW changes, the number of resources available for data transmission may also change. The WTRU may select the transmit block size based on the control information it receives. If the UW length changes, the transport block size may also change, resulting in a change in the coding rate. The UW length may be signaled in the DCI, and may be a new parameter to consider for transport block size determination.

The length of the UW may be indicated in the uplink grant, or the downlink assignment, and the time when the new UW (length) is employed may be either implicit, or signaled. The UW length may be limited to several options to reduce the control channel overhead. The length and index of the UW within the set of choices, may also be signaled semi-statically.

Examples of subframe structures using UW DFT-S-OFDM are discussed further herein. Some such subframe structures can be used in LTE systems, or environments similar to existing LTE systems. Such LTE-similar environments can be characterized by channel delay spread, by which the CP size must cover.

Figure 24A:
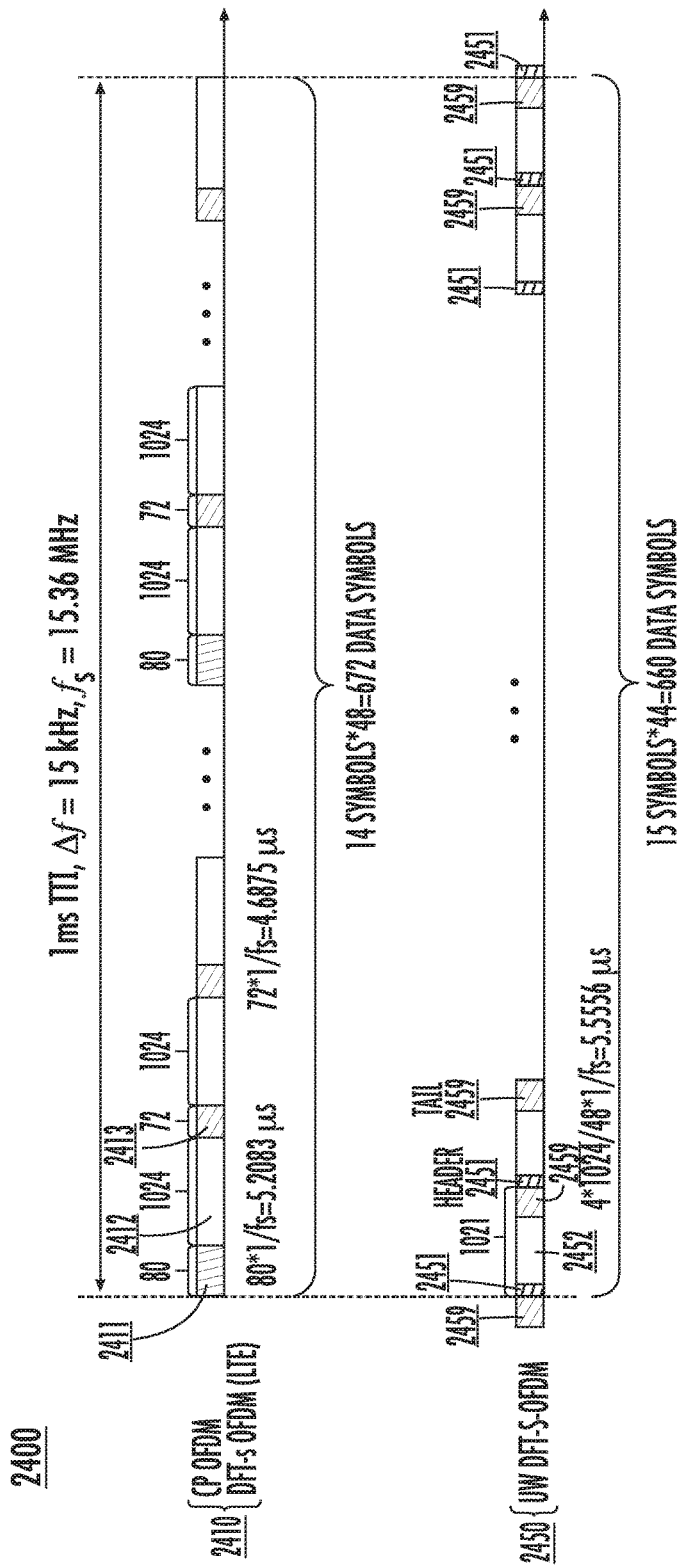
FIG. 24A is a signal diagram illustrating an example of a subframe structure of UW DFT-S-OFDM compared to a subframe structure of cyclic prefix (CP) OFDM/CP DFT-S-OFDM with a 1 ms transmission time interval (TTI)

FIG. 24A is a signal diagram illustrating an example of a subframe structure of UW DFT-S-OFDM compared to a subframe structure of CP OFDM/CP DFT-S-OFDM with 1 ms TTI. As shown in signal diagram 2400, the top subframe structure 2410 can be used in LTE for UL (CP OFDM) and DL (CP DFT-S-OFDM) subframes.

For a 1 ms TTI, 15 OFDM symbols of UW DFT-S-OFDM signal can fit into 1 TTI as shown in the bottom subframe structure 2450. The sum of UW symbols at the header 2451 and tail 2459 may be 4, where the UW symbols may be the symbols that are fed into the DFT block at the tail and/or the header. How these 4 symbols are distributed between the header and the tail (for example, the number of symbols in the header and in the tail) may be a design choice. For this design, the length of the header 2451 and tail 2459, which may be considered an effective CP length for UW DFT-S-OFDM subframe structure 2450, may be slightly longer than the CP 2411 size of OFDM/DFT-S-OFDM in LTE subframe structure 2410. For example, the length of the header 2451 and tail 2459 may be 5.5556 μs while the length of CP 2411 may be 5.2083 μs and may be 80 samples. Further, the data parts, such as data part 2412, and the CPs, such as CP 2411 and CP 2413, of the OFDM/DFT-S-OFDM LTE subframe structure 2410 may be sized to be used in a 1 ms TTI. Also, data part 2452 of UW DFT-S-OFDM subframe structure 2450 may be approximately the same length as data part 2412 of OFDM/DFT-S-OFDM subframe structure 2410. Also, the repeating header 2451, data parts, such as data part 2452, and repeating tail 2459 of UW DFT-S-OFDM subframe structure 2450 may be sized to be used in a 1 ms TTI.

Figure 24B:
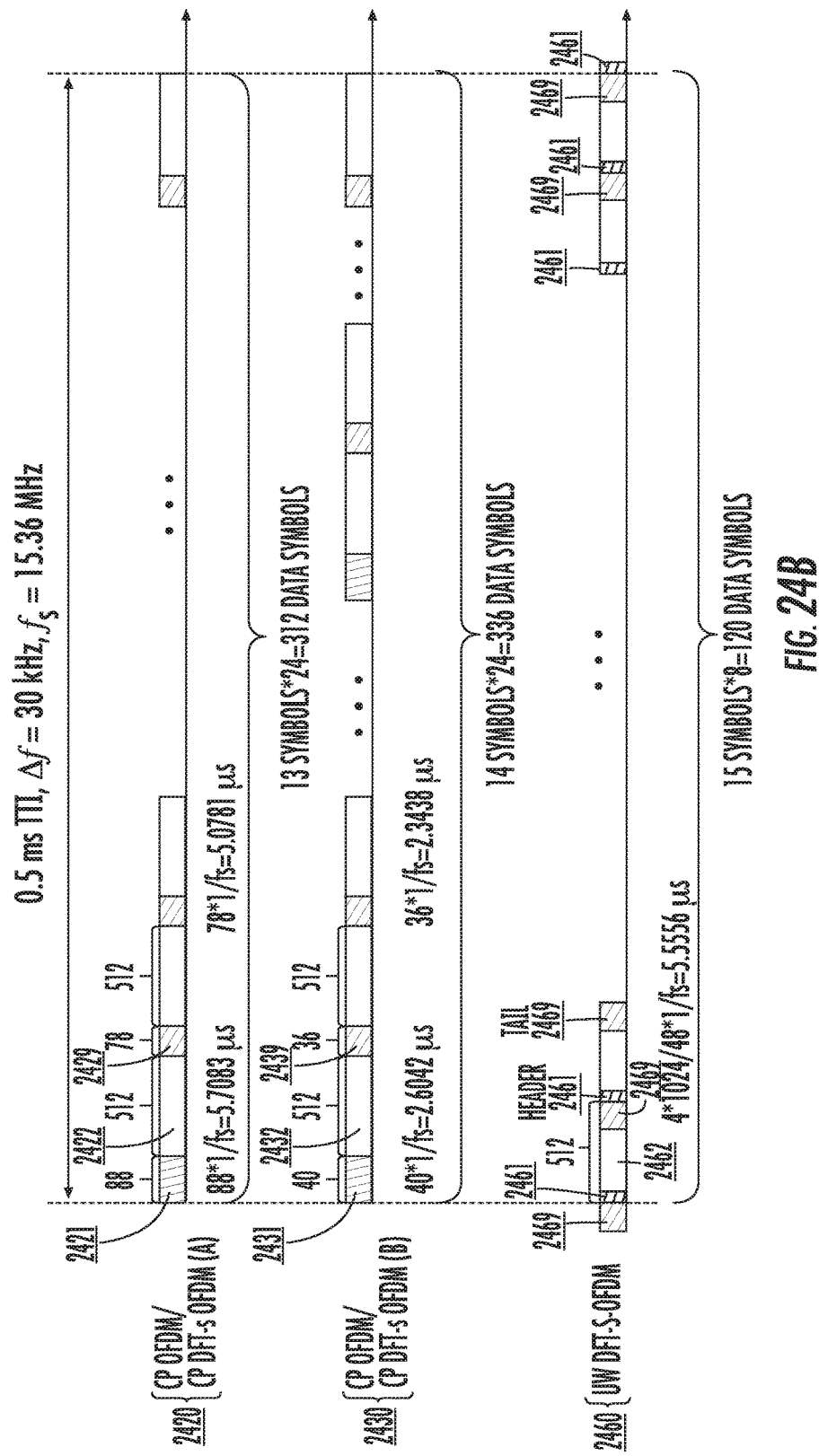
FIG. 24B is a signal diagram illustrating an example of a subframe structure of UW DFT-S-OFDM compare to a subframe structure of CP OFDM/CP DFT-S-OFDM with a 0.5 ms TTI.

FIG. 24B is a signal diagram illustrating an example of a subframe structure of UW DFT-S-OFDM compare to a subframe structure of CP OFDM/CP DFT-S-OFDM with a 0.5 ms TTI. In an example using a 0.5 ms TTI, in order to show the system working in an LTE-similar environment, a design of the subframe structures for CP OFDM/DFT-S-OFDM are shown in the top two subframe structures 2420, 2430 of FIG. 24B. It is noted that in the design of subframe structure 2420, 13 OFDM symbols can fit into a 0.5 ms TTI. In the design of subframe structures 2430, although there are 14 symbols in the 0.5 ms TTI, the size of CP 2431 may be about only of half of the size of CP 2421 in the design of subframe structure 2420, which is a choice that may be applicable to channels with short delay spread. For UW DFT-S-OFDM, the number of UW DFT-s-OFDM symbols in one TTI does not change, whether the TTI is 1 ms or 0.5 ms. The number of samples in the header and the tails also do not change whether the TTI is 1 ms or 0.5 ms. For example, header 2461 in subframe structure 2460 in FIG. 24B has the same number of samples as header 2451 in subframe structure 2450 in FIG. 24A. Likewise, tail 2469 in subframe structure 2460 in FIG. 24B has the same number of samples as tail 2459 in subframe structure 2450 in FIG. 24A. Further, data part 2462 in subframe structure 2460 in FIG. 24B has approximately half of number of samples as data part 2452 in subframe structure 2450 in FIG. 24A. In addition, data part 2462 has the same number of samples as data part 2422 in subframe structure 2420 and as data part 2432 in subframe structure 2430. Further, subframe structure 2420 includes CP 2429 and subframe structure 2430 includes CP 2439. The CPs and the data parts of subframe structure 2420 and subframe structure 2430 are sized for a 0.5 ms TTI frame.

Figure 24C:
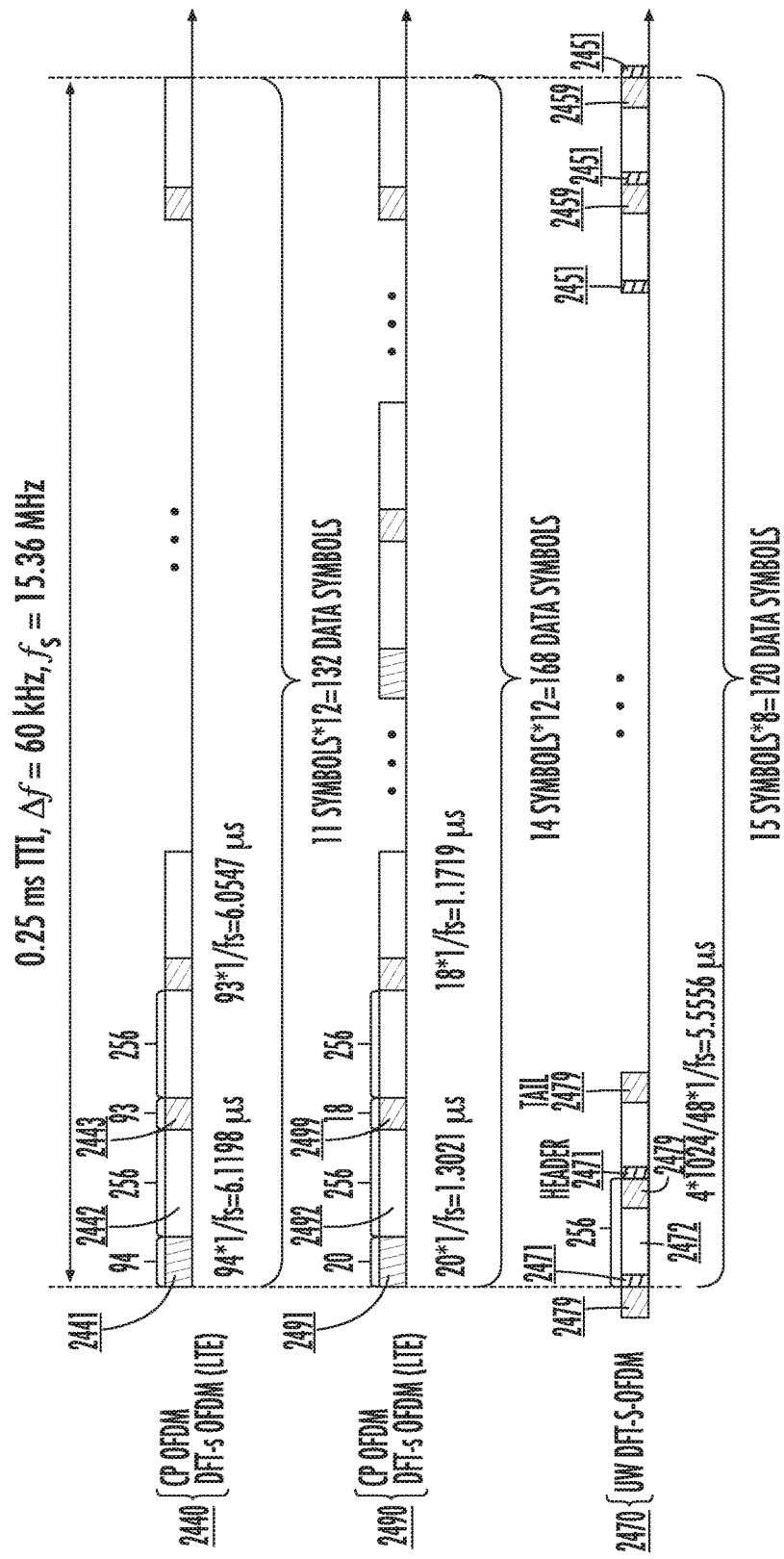
FIG. 24C is a signal diagram illustrating an example of a subframe structure of UW DFT-S-OFDM compared to a subframe structure of CP OFDM/CP DFT-S-OFDM with a 0.25 ms TTI.

FIG. 24C is a signal diagram illustrating an example of a subframe structure of UW DFT-S-OFDM compared to a subframe structure of CP OFDM/CP DFT-S-OFDM with a 0.25 ms TTI. A 0.25 ms TTI can also be used in an LTE-similar design. For this case, two subframe structures for CP OFDM/DFT-S-OFDM are shown in subframe structures 2440, 2490 of FIG. 24C, of length 11 symbols and 14 symbols respectively. The subframe structure for UW using a 0.25 ms TTI, UW DFT-S-OFDM 2470, is shown in the bottom of FIG. 24C. As shown in the example in FIG. 24C, the repeating header 2471, data parts, such as data part 2472, and repeating tail 2479 of UW DFT-S-OFDM subframe structure 2470 may be sized to be used in a 0.25 ms TTI. Further, the data parts, such as data part 2442, and the CPs, such as CP 2441 and CP 2443, of the OFDM/DFT-S-OFDM LTE subframe structure 2440, and the data parts, such as data part 2492, and the CPs, such as CP 2491 and CP 2499, of the OFDM/DFT-S-OFDM LTE subframe structure 2490 may be sized to be used in a 0.25 ms TTI.

As shown in these example designs, if the environment changes (for example, the channel delay spread changes), there is no need to change the overall frame structure. Only the total header, data and tail size may need to be changed, which makes the design very flexible and robust. Accordingly, there may be no need to change hardware, which may increase efficiency.

With the above mentioned flexibility, the traditional modulation and coding scheme (MCS) may or may not be reused. A new MCS for UW DFT-S-OFDM may be a function of a number of symbols being used for the tail and header, in addition to coding rate and quadrature amplitude modulation (QAM) modulation order.

In an example, if the allocation of the DFT output to the input of IDFT changes between two consecutive TTIs, the UW in the last symbol of the first TTI cannot serve as CP for the first symbol of the second TTI. To solve such a problem or, in general, for better reception of subframes, a special first time-domain symbol of a subframe after a change of spectral allocation and a special last time-domain symbol of a subframe before the change of spectral allocation may be used.

Figure 25:
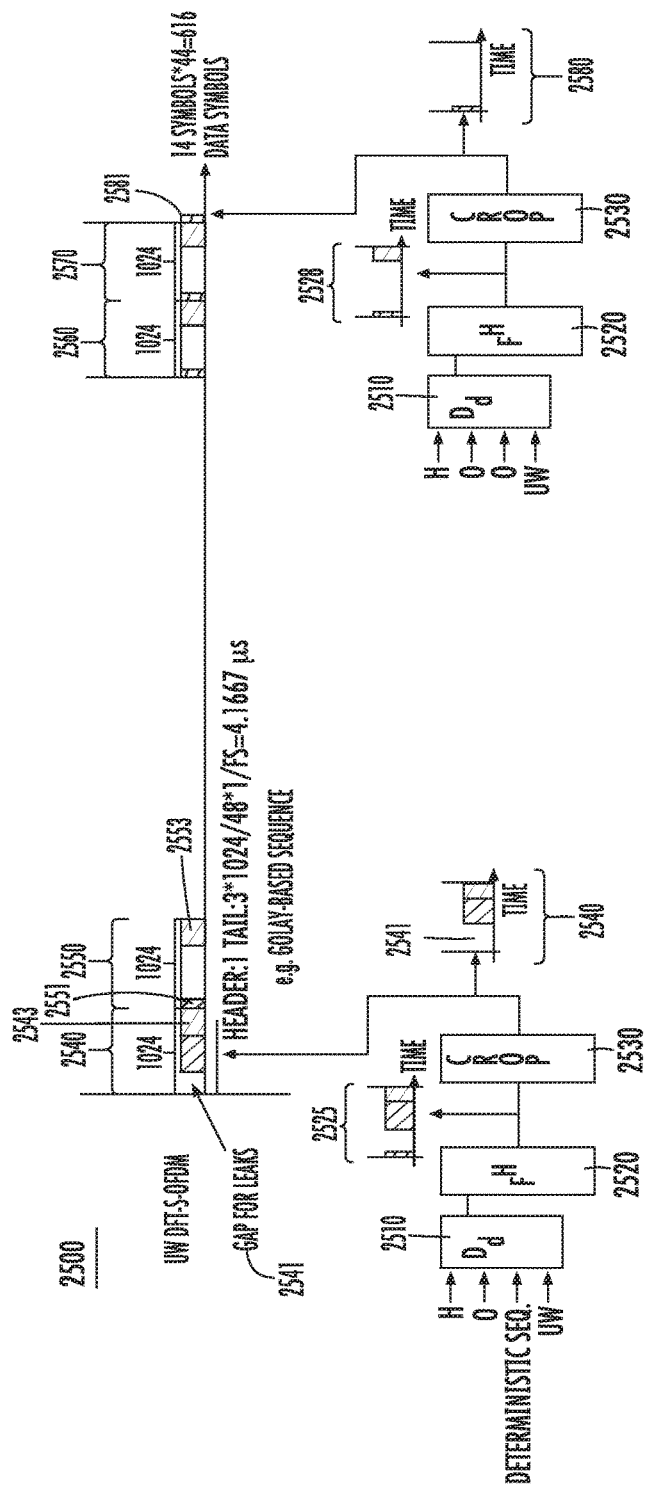
FIG. 25 is a block diagram illustrating an example of a subframe structure of UW DFT-S-OFDM with a special first symbol and a special last symbol.

FIG. 25 is a block diagram illustrating an example of a subframe structure of UW DFT-S-OFDM with a special first symbol and a special last symbol. In the first time-domain symbol mentioned above, a time-domain gap may be created. As shown in an example shown in block diagram 2500, a time-domain gap 2451 may be created between the header samples and a set of deterministic samples at the output of IDFT 2520.

For example, an input DFT block 2510 may map header samples, a UW, zeros, and data. The results of the input DFT block 2510 may be provided to IDFT block 2520, which may generate symbols, such as symbols 2540, 2550, 2560, 2570, 2580. If the allocation of the input DFT block 2510 output to the input of IDFT block 2520 changes between two consecutive TTIs, a deterministic sequence may be mapped by the input DFT block 2510 along with the UW and data for a symbol 2525. The IFDT block 2520 may then receive this symbol 2525. Before sending this symbol out, a header crop function 2530 can be used to remove the header samples, resulting in symbol 2540 with gap 2541. As a result, the gap may protect against problems due to leaks from the previous transmission. In an example, the gap may act as a guard interval.

Accordingly, symbol 2540 may be generated with gap 2541, data part and tail 2543, and without a header. In comparison, the next 12 symbols in the TTI may include a header, data part and tail. As an example, symbol 2550 may include a header 2551, data part and tail 2553.

For the last special symbol 2580, as mentioned above, the input DFT block 2510 may send a header and UW only. The time-domain UW part, shown in symbol 2528, for example, may be cropped the output of IDFT block 2520 by header crop function 2530. So, for a resulting symbol 2580, only the header samples 2581 are sent. It is noted that the last special symbol 2580 may actually be sent after the end of the subframe where a change in resource allocation takes place. For example, the subframe may end at symbol 2570 and then the last special symbol 2580 with header samples 2581 may be sent.

In another example, a deterministic sequence may be attached to the first symbol after a change in resource allocation in other ways. In an example of one such method, the deterministic sequence may be directly attached before the UW of the first symbol in the time domain. This sequence may be wide band, and may occupy the whole bandwidth. In multiple access scenarios in UL, different users may choose or be assigned with, different orthogonal sequences such that they do not interference with each other.

Figure 26:
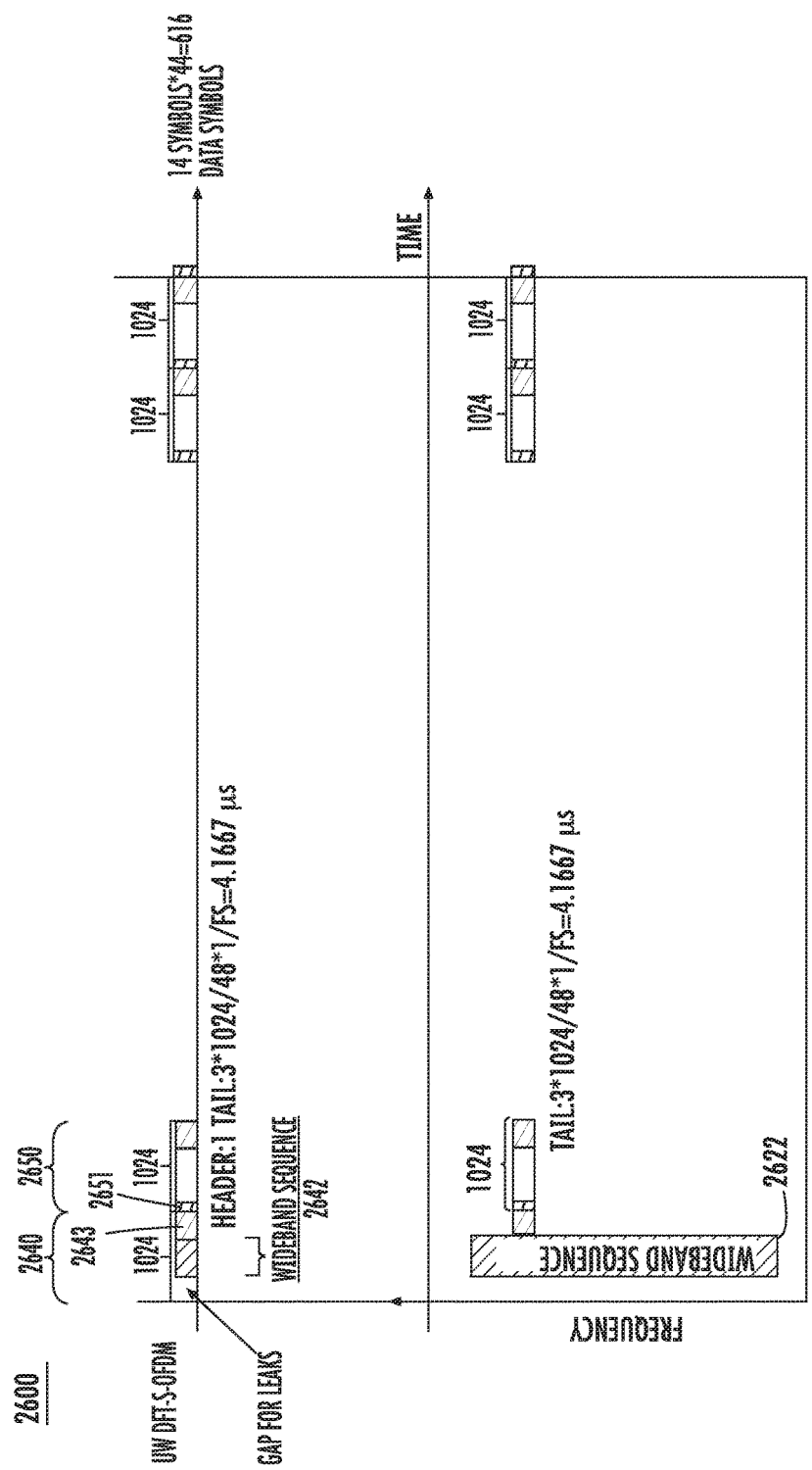
FIG. 26 is a signal diagram illustrating an example subframe structure of UW DFT-S-OFDM with a time domain wide band sequence attached to the first symbol.

FIG. 26 is a signal diagram illustrating an example subframe structure of UW DFT-S-OFDM with a time domain wide band sequence attached to the first symbol. As shown in signal diagram 2600, a deterministic wideband sequence 2642 may be directly attached in symbol 2640 before the UW of the first symbol in the time domain. The UW of the first symbol in the time domain may include tail 2643 and header 2651. Header 2651 may be the header of symbol 2650. Further, deterministic wideband sequence 2642 may have bandwidth 2622 which may occupy the whole frequency bandwidth, as shown in FIG. 26.

Examples of correction of impairments using the UW are further discussed herein. The UW may be used to detect and/or correct impairments in the received signal that may have been due to, among various other reasons, imperfections at the transmitter and receiver hardware. In one exemplary method, the UW may be designed to detect any I/Q imbalance, estimate any I/Q imbalance or both. The UW sequence that is fed into the DFT block may be designed such that it may include a complex sequence wherein the real and imaginary components of this sequence may include two sequences that are orthogonal to each other.

For example, the UW sequence w may be defined as w=x+j y, where x and y are vectors of the same size and are orthogonal, i.e., $x^H y=0$, where the superscript H is the Hermitian operator. For example, x and y could be chosen from Golay sequences, Walsh sequences, or any other orthogonal sequences.

At the receiver side, the I component of the received UW (the real component) may be correlated with x, while the Q component of the received UW (the imaginary component) may be correlated with y. The correlation outputs may indicate an amplitude offset between the I and Q branches. In another exemplary method, at the receiver side, the I component of the received UW (the real component) may be correlated with y, while the Q component of the received UW (the imaginary component) may be correlated with x. The correlation outputs may indicate a phase offset between the I and Q branches.

In another example method, the out-of-band emission characteristics of a signal with UW may be improved by improving the phase continuity between samples of the signal. To achieve this, a dummy coefficient may be inserted between the last sample of data and the first sample of the UW, for example before the DFT operation. The dummy coefficient may be computed such that the data portion and the UW portion of the signal in the time domain, that is, the signal at the output of the IFFT block, has continuous phase. The dummy coefficient may be computed for every symbol, such as the DFT-s-OFDM symbol.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU) for transmitting information using a unique word (UW) with discrete Fourier transform spread orthogonal frequency division multiplexing (DFT-s-OFDM), the method comprising:

generating, by the WTRU, a plurality of reference sequences;

generating, by the WTRU, a demodulation Reference Signal (DMRS) sequence based on upsampling of the plurality of reference sequences, wherein the DMRS sequence includes a plurality of repeating sequences, wherein each repeating sequence includes a head sequence, one of the plurality of reference sequences and a tail sequence, and wherein a UW sequence within the DMRS sequence includes one of the head sequences and one of the tail sequences;

generating, by the WTRU, a DMRS based on a waveform operation on the DMRS sequence; and transmitting, by the WTRU, the DMRS as a reference signal.

2. The method of claim 1, further comprising:

generating, by the WTRU, a plurality of input vectors, wherein each input vector includes a sequence of data symbols and the UW sequence;

generating, by the WTRU, a plurality of DFT-s-OFDM symbols, wherein each DFT-s-OFDM symbol is based on a waveform operation on each of the input vectors; and transmitting, by the WTRU, the plurality of DFT-s-OFDM symbols.

3. The method of claim 2, wherein the DMRS and the plurality of DFT-s-OFDM symbols are transmitted in bursty transmissions.

4. The method of claim 2, wherein the DMRS and the plurality of DFT-s-OFDM symbols are used by the WTRU to perform channel estimation.

5. The method of claim 1, wherein the DMRS sequence is generated using linear precoding.

6. The method of claim 1, wherein the DMRS sequence is generated using discrete Fourier transform (DFT) operations.

7. The method of claim 1, wherein the DMRS is used by the WTRU to perform channel estimation.

8. The method of claim 1, wherein an additional DMRS and additional DFT-s-OFDM symbols are transmitted for each of a plurality of additional subbands.

9. A wireless transmit/receive unit (WTRU) for transmitting information using a unique word (UW) with discrete Fourier transform spread orthogonal frequency division multiplexing (DFT-s-OFDM), the WTRU comprising:

a processor configured to generate a plurality of reference sequences;

the processor further configured to generate a demodulation Reference Signal (DMRS) sequence based on upsampling of the plurality of reference sequences, wherein the DMRS sequence includes a plurality of repeating sequences, wherein each repeating sequence includes a head sequence, one of the plurality of reference sequences and a tail sequence, and wherein a UW sequence within the DMRS sequence includes one of the head sequences and one of the tail sequences;

the processor further configured to generate a DMRS based on a waveform operation on the DMRS sequence; and a transceiver operatively coupled to the processor, the transceiver and the processor configured to transmit the DMRS as a reference signal.

10. The WTRU of claim 9, further comprising:

the processor further configured to generate a plurality of input vectors, wherein each input vector includes a sequence of data symbols and the UW sequence;

the processor further configured to generate a plurality of DFT-s-OFDM symbols, wherein each DFT-s-OFDM symbol is based on a waveform operation on each of the input vectors; and the transceiver and the processor further configured to transmit the plurality of DFT-s-OFDM symbols.

11. The WTRU of claim 10, wherein the DMRS and the plurality of DFT-s-OFDM symbols are transmitted in bursty transmissions.

12. The WTRU of claim 10, wherein the DMRS and the plurality of DFT-s-OFDM symbols are used by the WTRU to perform channel estimation.

13. The WTRU of claim 9, wherein the DMRS sequence is generated using linear precoding.

14. The WTRU of claim 9, wherein the DMRS sequence is generated using discrete Fourier transform (DFT) operations.

15. The WTRU of claim 9, wherein the DMRS is used by the WTRU to perform channel estimation.

16. The WTRU of claim 9, wherein an additional DMRS and additional DFT-s-OFDM symbols are transmitted for each of a plurality of additional subbands.

* * * * *